(12) United States Patent
Kalathuru et al.

(10) Patent No.: US 11,461,330 B2
(45) Date of Patent: *Oct. 4, 2022

(54) MANAGED QUERY SERVICE

(71) Applicant: Amazon Technologies, Inc., Seattle, WA (US)

(72) Inventors: Bhargava Ram Kalathuru, Seattle, WA (US); Jian Fang, Sammamish, WA (US); Xing Wu, Redmond, WA (US); Yuanyuan Yue, Bellevue, WA (US); Pratik Bhagwat Gawande, Seattle, WA (US); Turkay Mert Hocanin, New York, NY (US); Jason Douglas Denton, Seattle, WA (US); Luca Natali, Kenmore, WA (US); Rahul Sharma Pathak, Seattle, WA (US); Abhishek Rajnikant Sinha, Redmond, WA (US); Sumeetkumar Veniklal Maru, Redmond, WA (US); Armen Tangamyan, Bellevue, WA (US); Yufeng Jiang, Sammamish, WA (US)

(73) Assignee: Amazon Technologies, Inc., Seattle, WA (US)

(*) Notice: Subject to any disclaimer, the term of this patent is extended or adjusted under 35 U.S.C. 154(b) by 61 days.

This patent is subject to a terminal disclaimer.

(21) Appl. No.: 17/067,495

(22) Filed: Oct. 9, 2020

(65) Prior Publication Data
US 2021/0097080 A1    Apr. 1, 2021

Related U.S. Application Data

(63) Continuation of application No. 15/470,829, filed on Mar. 27, 2017, now Pat. No. 10,803,060.
(Continued)

(51) Int. Cl.
G06F 16/20    (2019.01)
G06F 16/21    (2019.01)
(Continued)

(52) U.S. Cl.
CPC .......... *G06F 16/24545* (2019.01); *G06F 9/50* (2013.01); *G06F 9/505* (2013.01);
(Continued)

(58) Field of Classification Search
CPC .... G06F 16/24545; G06F 16/20; G06F 16/25; G06F 16/27; G06F 16/90335;
(Continued)

(56) References Cited

U.S. PATENT DOCUMENTS 6,314,447 B1    11/2001    Lea et al.
6,366,915 B1    4/2002    Rubert et al.
(Continued)

FOREIGN PATENT DOCUMENTS

EP    2778967    9/2014
JP    2012058815    3/2012
(Continued)

OTHER PUBLICATIONS

International Search Report and Written Opinion from PCT/US2017/049640, dated Nov. 27, 2017, Amazon Technologies, Inc., pp. 1-13.
(Continued)

*Primary Examiner* — Jorge A Casanova
(74) *Attorney, Agent, or Firm* — Robert C. Kowert; Kowert, Hood, Munyon, Rankin & Goetzel, P.C.

(57) ABSTRACT

Queries may be received and executed by a managed query service. A query directed to data sets that are separately stored in a remote data store may be received. Computing resources to execute the query may be provisioned from a pool of computing resources that are configured to execute queries. The query may be routed to the provisioned com-
(Continued)

puting resources to execute the query. Results may be obtained from the computing resource and provided to a submitter of the query.

20 Claims, 15 Drawing Sheets

Related U.S. Application Data

(60) Provisional application No. 62/382,477, filed on Sep. 1, 2016.

(51) Int. Cl.
| | |
|---|---|
| *G06F 16/245* | (2019.01) |
| *G06F 16/2453* | (2019.01) |
| *G06F 16/2455* | (2019.01) |
| *G06F 16/2458* | (2019.01) |
| *G06F 16/248* | (2019.01) |
| *G06F 16/25* | (2019.01) |
| *G06F 16/27* | (2019.01) |
| *G06F 9/50* | (2006.01) |
| *H04L 67/10* | (2022.01) |
| *H04L 67/1008* | (2022.01) |
| *H04L 67/1029* | (2022.01) |
| *H04L 67/1031* | (2022.01) |
| *G06F 16/28* | (2019.01) |
| *G06F 16/903* | (2019.01) |

(52) U.S. Cl.
CPC .......... *G06F 9/5022* (2013.01); *G06F 9/5044* (2013.01); *G06F 9/5055* (2013.01); *G06F 9/5061* (2013.01); *G06F 9/5088* (2013.01); *G06F 16/20* (2019.01); *G06F 16/211* (2019.01); *G06F 16/248* (2019.01); *G06F 16/2455* (2019.01); *G06F 16/2471* (2019.01); *G06F 16/24549* (2019.01); *G06F 16/24553* (2019.01); *G06F 16/25* (2019.01); *G06F 16/27* (2019.01); *G06F 16/282* (2019.01); *G06F 16/90335* (2019.01); *H04L 67/10* (2013.01); *H04L 67/1008* (2013.01); *H04L 67/1029* (2013.01); *H04L 67/1031* (2013.01); *G06F 9/5027* (2013.01); *G06F 16/245* (2019.01); *G06F 2209/501* (2013.01); *G06F 2209/503* (2013.01); *G06F 2209/508* (2013.01); *G06F 2209/5011* (2013.01)

(58) Field of Classification Search
CPC ......... G06F 16/24549; G06F 16/24553; G06F 16/211; G06F 16/2471; G06F 16/2455; G06F 16/282; G06F 16/248; G06F 9/5061; G06F 9/5022; G06F 9/5088; G06F 9/5055; G06F 9/505; G06F 9/5044; G06F 16/245; G06F 2209/508; G06F 2209/5011; G06F 9/5027; G06F 2209/501; G06F 2209/503; H04L 29/08171; H04L 29/08261; H04L 29/0827; H04L 29/08135
See application file for complete search history.

(56) References Cited

U.S. PATENT DOCUMENTS

| | | | |
|---|---|---|---|
| 6,473,750 | B1 | 10/2002 | Petculescu et al. |
| 6,859,926 | B1 | 2/2005 | Brenner et al. |
| 7,243,093 | B2 | 7/2007 | Cragun et al. |
| 7,406,461 | B1 | 7/2008 | Chapman et al. |
| 8,429,096 | B1 | 4/2013 | Soundararajan et al. |
| 8,429,097 | B1 | 4/2013 | Sivasubramanian et al. |
| 8,782,075 | B2 | 7/2014 | Zane et al. |
| 9,208,032 | B1 | 12/2015 | McAlister et al. |
| 10,762,086 | B2 | 9/2020 | Wu et al. |
| 10,803,060 | B2 | 10/2020 | Kalathuru et al. |
| 2004/0205759 | A1 | 10/2004 | Oka |
| 2008/0201459 | A1 | 8/2008 | Vul et al. |
| 2010/0094892 | A1 | 4/2010 | Bent et al. |
| 2012/0179644 | A1 | 7/2012 | Miranker |
| 2013/0024442 | A1 | 1/2013 | Santosuosso et al. |
| 2013/0160014 | A1 | 6/2013 | Watanabe et al. |
| 2013/0262638 | A1 | 10/2013 | Kumarasamy |
| 2014/0032535 | A1 | 1/2014 | Singla |
| 2014/0074540 | A1 | 3/2014 | Evans et al. |
| 2014/0149355 | A1 | 5/2014 | Gupta et al. |
| 2014/0156632 | A1 | 6/2014 | Yu et al. |
| 2014/0229221 | A1 | 8/2014 | Shih et al. |
| 2014/0280076 | A1 | 9/2014 | Sumizawa |
| 2015/0040180 | A1 | 2/2015 | Jacobson et al. |
| 2015/0149501 | A1 | 5/2015 | Prakash et al. |
| 2015/0234682 | A1 | 8/2015 | Dageville et al. |
| 2015/0234922 | A1 | 8/2015 | Dageville et al. |
| 2016/0373478 | A1 | 12/2016 | Doubleday |
| 2017/0316078 | A1 | 11/2017 | Funke et al. |
| 2018/0039674 | A1 | 2/2018 | Seyvet et al. |

FOREIGN PATENT DOCUMENTS

| | | |
|---|---|---|
| JP | 2015529366 | 10/2015 |
| WO | 2014039919 | 3/2014 |

OTHER PUBLICATIONS

Office Action from Australian Application No. 2017321715, dated Feb. 27, 2020, Amazon Technologies, Inc. pp. 1-3.
Office action from Japanese Application No. 2019-511461, dated Feb. 12, 2020, (English translation and Japanese version), pp. 1-26.
Office Action from Japanese Application No. 2019-511461, dated, Feb. 12, 2018, pp. 1-18.
Search Report and Written Opinion from Application No. 11201901511Q, dated Jun. 2, 2020, pp. 1-9.
Office action from European Application No. 17765532.1-1222, dated Dec. 2, 2020, pp. 1-7.
Summons to attend oral proceedings mailed Sep. 22, 2021 in EP Application No. 17765532.1, Amazon Technologies, Inc.
Anonymous, "optimization—Are SQL Execution Plans based on Schema or Data or both?", Stack Overflow.com, Retrieved from the Internet: URL:https://web.archive.org/web/20160708184640/https://stackoverflow.com/questions/4787205/are-sql-execution-plans-based-onschema-or-data-or-both, Jul. 8, 2016.

MANAGED QUERY SERVICE

RELATED APPLICATIONS

This application is a continuation of U.S. patent application Ser. No. 15/470,829, filed Mar. 27, 2017, which claims benefit of priority to U.S. Provisional Application Ser. No. 62/382,477, Sep. 1, 2016, and which are incorporated herein by reference in their entirety.

BACKGROUND

Computing systems for querying of large sets of data can be extremely difficult to implement and maintain. In many scenarios, for example, it is necessary to first create and configure the infrastructure (e.g. server computers, storage devices, networking devices, etc.) to be used for the querying operations. It might then be necessary to perform extract, transform, and load ("ETL") operations to obtain data from a source system and place the data in data storage. It can also be complex and time consuming to install, configure, and maintain the database management system ("DBMS") that performs the query operations. Moreover, many DBMS are not suitable for querying extremely large data sets in a performant manner.

Computing clusters can be utilized in some scenarios to query large data sets in a performant manner. For instance, a computing cluster can have many nodes that each execute a distributed query framework for performing distributed querying of a large data set. Such computing clusters and distributed query frameworks are, however, also difficult to implement, configure, and maintain. Moreover, incorrect configuration and/or use of computing clusters such as these can result in the non-optimal utilization of processor, storage, network and, potentially, other types of computing resources.

The disclosure made herein is presented with respect to these and other considerations.

Figure 1:
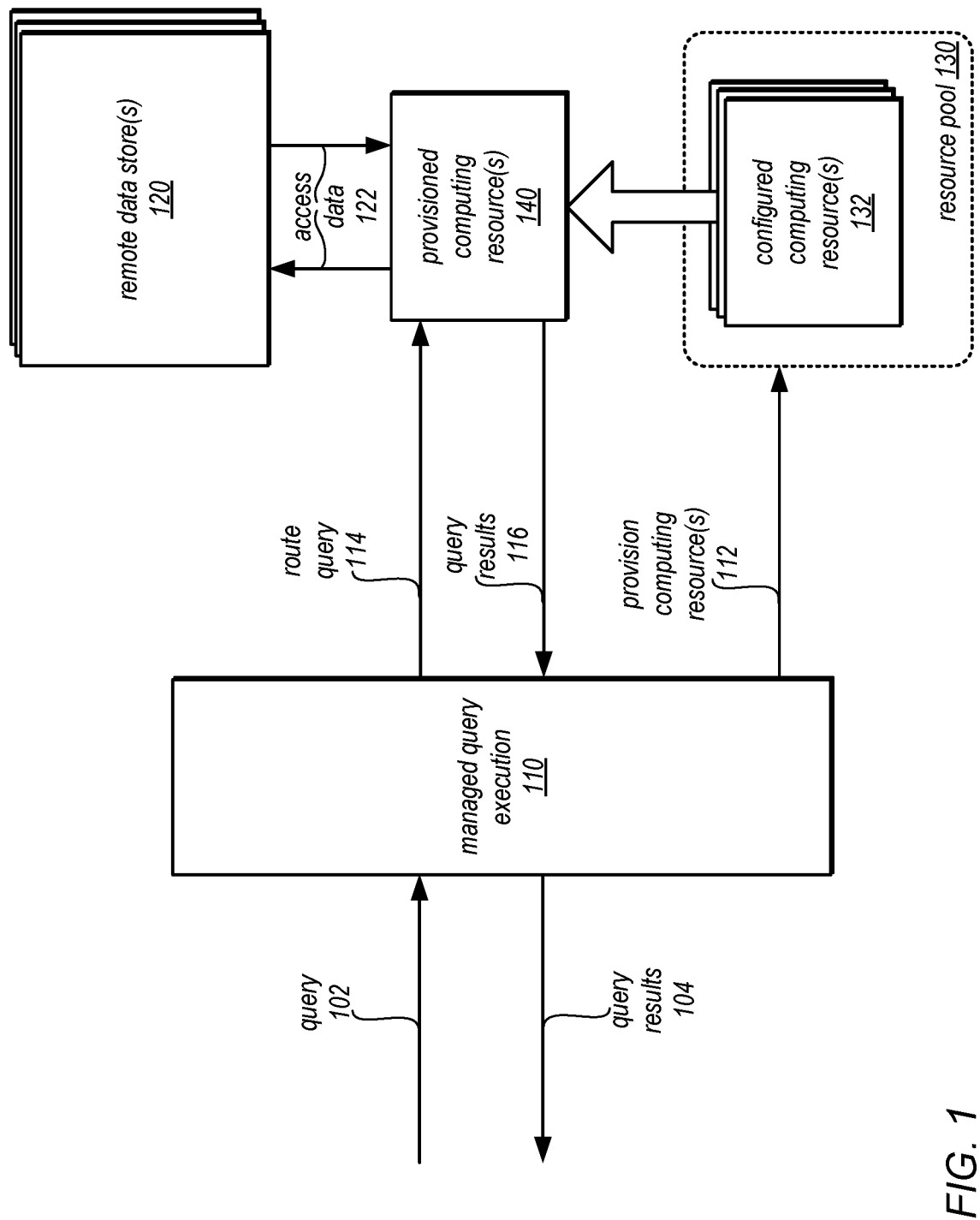
FIG. 1 illustrates a logical block diagram of a centralized data store for multiple data processing environments, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

DETAILED DESCRIPTION OF EMBODIMENTS

Various embodiments of a managed query execution are described herein. Through an implementation of these technologies, a networked managed query service can be provided that allows even large data sets to be queried in a performant manner, in various embodiments. Moreover, some embodiments of the disclosed technologies allows large data sets to be queried without managing infrastructure, such as computing clusters, without loading the data to be queried into a database or computing cluster, and without performing any ETL jobs. In this way, processor, storage, network bandwidth, and other types of computing resources can be utilized in a more efficient manner. Technical benefits other than those specifically identified herein can be realized through an implementation of the disclosed technologies.

In one embodiment, a managed query service is executed in a service provider network. The managed query service may provide functionality for querying data without managing infrastructure and without performing ETL operations, in one embodiment. For example, the managed query service may utilize computing clusters in order to execute queries with respect to remote data, in one embodiment. Computing resources, such as computing clusters, can be instantiated and configured to process queries prior to receiving query requests at the managed query service, in one embodiment. The instantiated and configured computing resources that are available for use by the managed query service may then be added to a pool of computing resources, in one embodiment.

In order to utilize the managed query service, a user can copy the data to be queried to a location provided by a network storage service, in one embodiment. The data can be stored in many types of formats, in some embodiments. A user interface ("UI") is also provided for defining a table definition, or definitions, or other schema information for the data, in various embodiments. For example, a table definition or other schema may be stored by a network data catalog service, in one embodiment. The data catalog service can make the table definition available to the computing clusters utilized by the managed query service, in various embodiments.

A query UI can also be provided for receiving requests to query the data from a user, in some embodiments. When a query is received, a computing resource can be provisioned from a pool of computing resources, in some embodiments. The computing resource can be randomly selected from the pool or selected based upon a number of factors including, but not limited to, previous queries submitted by the same requestor, desired query performance, user preferences, and others, in some embodiments. The selected computing resource may removed from the cluster pool and assigned to the query (or to the submitter of the query), in some embodiments. The query can then be routed to the selected computing resource for processing, in one embodiment. Results of the query can be returned to the query UI and presented to the user or stored utilizing the storage service, in some embodiments.

In at least some embodiments, subsequent queries from the same submitter can also be routed to the selected computing resource. If the selected computing resource is determined to be inactive, the selected computing cluster can be "scrubbed," such as by removing data associated with the submitter of the queries from memory or disk utilized by the host computers in the computing cluster, in one embodiment. The computing cluster can be returned to the warm cluster pool, in one embodiment.

The query performance of the computing clusters in the cluster pool can be monitored, in various embodiments and the number of computing clusters assigned to the cluster pool and the size of each computing cluster (i.e. the number of host computers in each computing cluster) can be adjusted.

FIG. 1 illustrates managed query execution, according to some embodiments. As noted above, managed query execution (e.g., implemented as part of a managed query service), can be performed so that a client, user, or other entity submitting queries is unaware of the manner in which the query is executed, in various embodiments. In this way, managed query execution can provide a common interface for accessing and querying many different kinds of data stored in different formats, in some embodiments. For example, as illustrated in FIG. 1, managed query execution 110 may serve as the network endpoint and interface for queries, such as query 102 and provide generated query results 104, in one embodiment. A client of managed query service 110 is unable to interact directly with processing resources, such as provisioned computing resources, in one embodiment. Multiple different clients can submit queries to the same network endpoint, though the queries may be dispatched to and executed on different computing resources. Load balancing, heat management, scaling other query execution considerations may be hidden from a client, in various embodiments.

Managed query execution 110 may provision computing resource(s) 112 from a resource pool 130, in one embodiment. Resource pool 130 may host multiple computing resource(s) 132 that are pre-configured to execute different types of queries (or the same queries), in some embodiments. Once a computing resource is obtained, managed query execution 110 may then route the query 114 to the provisioned computing resource(s) 140. Schema information, query execution parameters and other information may also be provided to provisioned computing resource(s), in some embodiments. Provisioned computing resources may access data 122 stored in one or multiple remote data stores 120, in some embodiments. The different data may be stored in different formats and data stores so that query operations, such as join operations, may be performed over distributed and/or differently formatted data, in some embodiments. The query results 116 may then be provided to managed query execution 116 (e.g., via a data store or as streamed results). Managed query execution 110 may then provide the results 104 back to a client or other requestor, in various embodiments.

Please note that the previous description of managed query execution is a logical illustration and thus is not to be construed as limiting as to the implementation of a data store, resource pool computing resource, or managed query execution.

This specification begins with a general description of a provider network that implements a managed query service. Then various examples of a managed query service, data catalog service, and resource manager service including different components/modules, or arrangements of components/module that may be employed as part of implementing the services are discussed. A number of different methods and techniques to implement managed query execution are then discussed, some of which are illustrated in accompanying flowcharts. Finally, a description of an example computing system upon which the various components, modules, systems, devices, and/or nodes may be implemented is provided. Various examples are provided throughout the specification.

Figure 2:
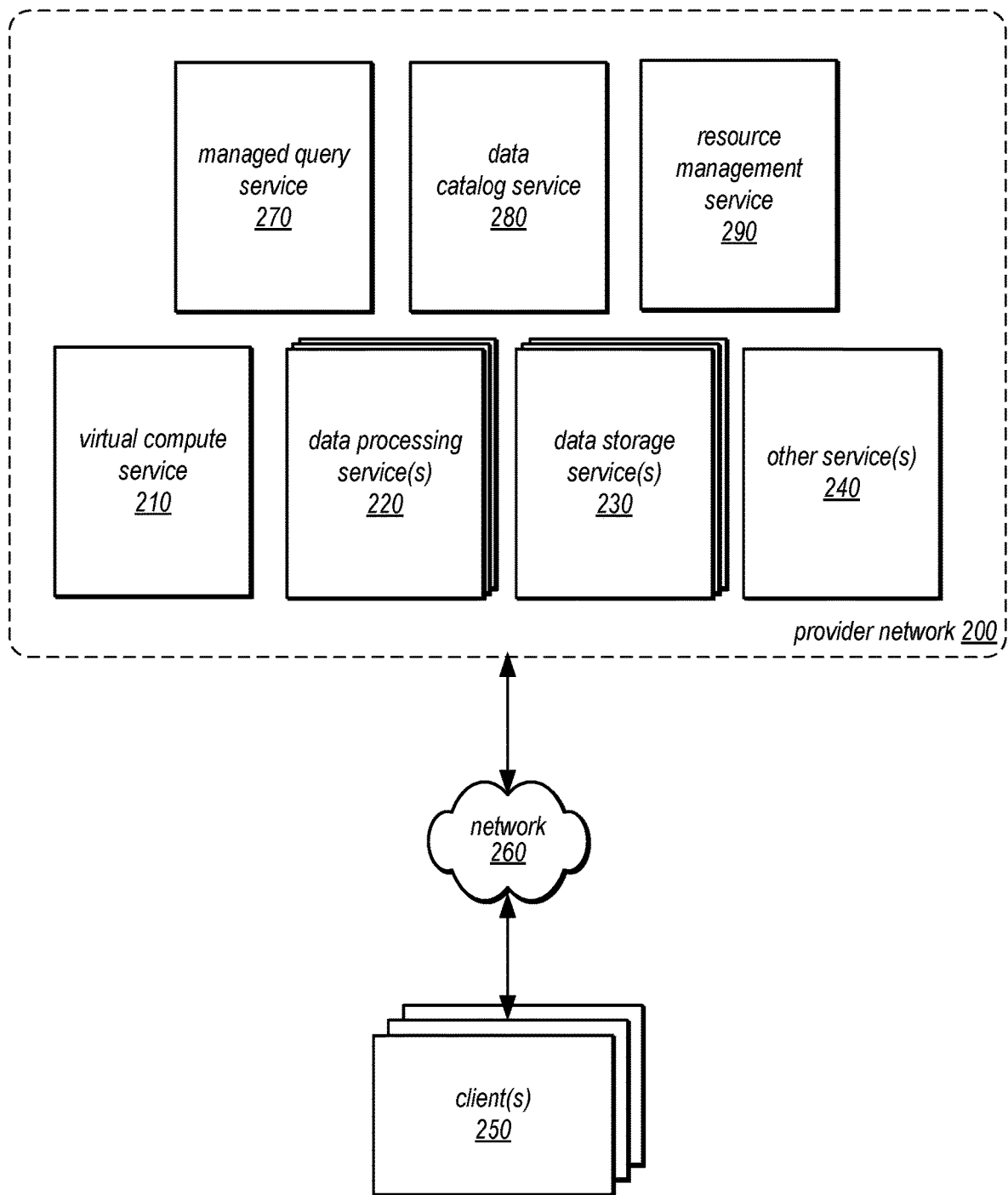
FIG. 2 is a logical block diagram illustrating a provider network offering a managed query service, according to some embodiments.

FIG. 2 is a logical block diagram illustrating a provider network offering a managed query service, according to some embodiments. Provider network 200 may be a private or closed system or may be set up by an entity such as a company or a public sector organization to provide one or more services (such as various types of cloud-based storage) accessible via the Internet and/or other networks to clients 250, in some embodiments. Provider network 200 may be implemented in a single location or may include numerous data centers hosting various resource pools, such as collections of physical and/or virtualized computer servers, storage devices, networking equipment and the like (e.g., FIGS. 15, 16 and computing system 2000 described below with regard to FIG. 17), needed to implement and distribute the infrastructure and storage services offered by the provider network 200. In some embodiments, provider network 200 may implement various computing resources or services, such as a virtual compute service 210, data processing service(s) 220, (e.g., relational or non-relational (NoSQL) database query engines, map reduce processing, data flow processing, and/or other large scale data processing techniques), data storage service(s) 230, (e.g., an object storage service, block-based storage service, or data storage service that may store different types of data for centralized access) other services 240 (any other type of network based services (which may include various other types of storage, processing, analysis, communication, event handling, visualization, and security services not illustrated), managed query service 270, data catalog service 280, and resource management service 290.

In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes), each of which may be similar to the computer system embodiment illustrated in FIG. 17 and described below. In various embodiments, the functionality of a given system or service component (e.g., a component of data storage service 230) may be implemented by a particular node or may be distributed across several nodes. In some embodiments, a given node may implement the functionality of more than one service system component (e.g., more than one data store component).

Virtual compute service 210 may be implemented by provider network 200, in some embodiments. Virtual computing service 210 may offer instances and according to various configurations for client(s) 250 operation. A virtual compute instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor). A number of different types of computing devices may be used singly or in combination to implement the compute instances and of provider network 200 in different embodiments, including general purpose or special purpose computer servers, storage devices, network devices and the like. In some embodiments instance client(s) 250 or other any other user may be configured (and/or authorized) to direct network traffic to a compute instance.

Compute instances may operate or implement a variety of different platforms, such as application server instances, Java™ virtual machines (JVMs), general purpose or special-purpose operating systems, platforms that support various interpreted or compiled programming languages such as Ruby, Perl, Python, C, C++ and the like, or high-performance computing platforms) suitable for performing client(s) 202 applications, without for example requiring the client(s) 250 to access an instance. Applications (or other software operated/implemented by a compute instance and may be specified by client(s), such as custom and/or off-the-shelf software.

In some embodiments, compute instances have different types or configurations based on expected uptime ratios. The uptime ratio of a particular compute instance may be defined as the ratio of the amount of time the instance is activated, to the total amount of time for which the instance is reserved. Uptime ratios may also be referred to as utilizations in some implementations. If a client expects to use a compute instance for a relatively small fraction of the time for which the instance is reserved (e.g., 30%-35% of a year-long reservation), the client may decide to reserve the instance as a Low Uptime Ratio instance, and pay a discounted hourly usage fee in accordance with the associated pricing policy. If the client expects to have a steady-state workload that requires an instance to be up most of the time, the client may reserve a High Uptime Ratio instance and potentially pay an even lower hourly usage fee, although in some embodiments the hourly fee may be charged for the entire duration of the reservation, regardless of the actual number of hours of use, in accordance with pricing policy. An option for Medium Uptime Ratio instances, with a corresponding pricing policy, may be supported in some embodiments as well, where the upfront costs and the per-hour costs fall between the corresponding High Uptime Ratio and Low Uptime Ratio costs.

Compute instance configurations may also include compute instances with a general or specific purpose, such as computational workloads for compute intensive applications (e.g., high-traffic web applications, ad serving, batch processing, video encoding, distributed analytics, high-energy physics, genome analysis, and computational fluid dynamics), graphics intensive workloads (e.g., game streaming, 3D application streaming, server-side graphics workloads, rendering, financial modeling, and engineering design), memory intensive workloads (e.g., high performance databases, distributed memory caches, in-memory analytics, genome assembly and analysis), and storage optimized workloads (e.g., data warehousing and cluster file systems). Size of compute instances, such as a particular number of virtual CPU cores, memory, cache, storage, as well as any other performance characteristic. Configurations of compute instances may also include their location, in a particular data center, availability zone, geographic, location, etc. . . . and (in the case of reserved compute instances) reservation term length. Different configurations of compute instances, as discussed below with regard to FIG. 3, may be implemented as computing resources associated in different pools of resources managed by resource management service 290 for executing jobs routed to the resources, such as queries routed to select resources by managed query service 270.

Data processing services 220 may be various types of data processing services to perform different functions (e.g., query or other processing engines to perform functions such as anomaly detection, machine learning, data lookup, or any other type of data processing operation). For example, in at least some embodiments, data processing services 230 may include a map reduce service that creates clusters of processing nodes that implement map reduce functionality over data stored in one of data storage services 240. Various other distributed processing architectures and techniques may be implemented by data processing services 230 (e.g., grid computing, sharding, distributed hashing, etc.). Note that in some embodiments, data processing operations may be implemented as part of data storage service(s) 230 (e.g., query engines processing requests for specified data). Data processing service(s) 230 may be clients of data catalog service 220 in order to obtain structural information for performing various processing operations with respect to data sets stored in data storage service(s) 230, as provisioned resources in a pool for managed query service 270.

Data catalog service 280 may provide a catalog service that ingests, locates, and identifies data and the schema of data stored on behalf of clients in provider network 200 in data storage services 230. For example, a data set stored in a non-relational format may be identified along with a container or group in an object-based data store that stores the data set along with other data objects on behalf of a same customer or client of provider network 200. In at least some embodiments, data catalog service 280 may direct the transformation of data ingested in one data format into another data format. For example, data may be ingested into data storage service 230 as single file or semi-structured set of data (e.g., JavaScript Object Notation (JSON)). Data catalog service 280 may identify the data format, structure, or any other schema information of the single file or semi-structured set of data. In at least some embodiments, the data stored in another data format may be converted to a different data format as part of a background operation (e.g., to discover the data type, column types, names, delimiters of fields, and/or any other information to construct the table of semi-structured data in order to create a structured version of the data set). Data catalog service 280 may then make the schema information for data available to other services, computing devices, or resources, such as computing resources or clusters configured to process queries with respect to the data, as discussed below with regard to FIGS. 3-7.

Data storage service(s) 230 may implement different types of data stores for storing, accessing, and managing data on behalf of clients 250 as a network-based service that enables clients 250 to operate a data storage system in a cloud or network computing environment. For example, data storage service(s) 230 may include various types of database storage services (both relational and non-relational) for storing, querying, and updating data. Such services may be enterprise-class database systems that are highly scalable and extensible. Queries may be directed to a database in data storage service(s) 230 that is distributed across multiple physical resources, and the database system may be scaled up or down on an as needed basis. The database system may work effectively with database schemas of various types and/or organizations, in different embodiments. In some embodiments, clients/subscribers may submit queries in a number of ways, e.g., interactively via an SQL interface to the database system. In other embodiments, external applications and programs may submit queries using Open Database Connectivity (ODBC) and/or Java Database Connectivity (JDBC) driver interfaces to the database system.

One data storage service 230 may be implemented as a centralized data store so that other data storage services may access data stored in the centralized data store for processing and or storing within the other data storage services, in some embodiments. A may provide storage and access to various kinds of object or file data stores for putting, updating, and getting various types, sizes, or collections of data objects or files. Such data storage service(s) 230 may be accessed via programmatic interfaces (e.g., APIs) or graphical user interfaces. A centralized data store may provide virtual block-based storage for maintaining data as part of data volumes that can be mounted or accessed similar to local block-based storage devices (e.g., hard disk drives, solid state drives, etc.) and may be accessed utilizing block-based data storage protocols or interfaces, such as internet small computer interface (iSCSI).

In at least some embodiments, one of data storage service(s) 230 may be a data warehouse service that utilizes a centralized data store implemented as part of another data storage service 230. A data warehouse service as may offer clients a variety of different data management services, according to their various needs. In some cases, clients may wish to store and maintain large of amounts data, such as sales records marketing, management reporting, business process management, budget forecasting, financial reporting, website analytics, or many other types or kinds of data. A client's use for the data may also affect the configuration of the data management system used to store the data. For instance, for certain types of data analysis and other operations, such as those that aggregate large sets of data from small numbers of columns within each row, a columnar database table may provide more efficient performance. In other words, column information from database tables may be stored into data blocks on disk, rather than storing entire rows of columns in each data block (as in traditional database schemes).

Managed query service 270, as discussed below in more detail with regard to FIGS. 3-7, may manage the execution of queries on behalf of clients so that clients may perform queries over data stored in one or multiple locations (e.g., in different data storage services, such as an object store and a database service) without configuring the resources to execute the queries, in various embodiments. Resource management service 290, may manage and provide pools of computing resources for different services like managed query service 270 in order to execute jobs on behalf the different services, as discussed above with regard to FIG. 1.

Generally speaking, clients 250 may encompass any type of client configurable to submit network-based requests to provider network 200 via network 260, including requests for storage services (e.g., a request to create, read, write, obtain, or modify data in data storage service(s) 240, etc.) or managed query service 270 (e.g., a request to query data in a data set stored in data storage service(s) 230). For example, a given client 250 may include a suitable version of a web browser, or may include a plug-in module or other type of code module that may execute as an extension to or within an execution environment provided by a web browser. Alternatively, a client 250 may encompass an application such as a database application (or user interface thereof), a media application, an office application or any other application that may make use of storage resources in data storage service(s) 240 to store and/or access the data to implement various applications. In some embodiments, such an application may include sufficient protocol support (e.g., for a suitable version of Hypertext Transfer Protocol (HTTP)) for generating and processing network-based services requests without necessarily implementing full browser support for all types of network-based data. That is, client 250 may be an application may interact directly with provider network 200. In some embodiments, client 250 may generate network-based services requests according to a Representational State Transfer (REST)-style network-based services architecture, a document- or message-based network-based services architecture, or another suitable network-based services architecture.

In some embodiments, a client 250 may provide access to provider network 200 to other applications in a manner that is transparent to those applications. For example, client 250 may integrate with an operating system or file system to provide storage on one of data storage service(s) 240 (e.g., a block-based storage service). However, the operating system or file system may present a different storage interface to applications, such as a conventional file system hierarchy of files, directories and/or folders. In such an embodiment, applications may not need to be modified to make use of the storage system service model. Instead, the details of interfacing to the data storage service(s) 240 may be coordinated by client 250 and the operating system or file system on behalf of applications executing within the operating system environment.

Clients 250 may convey network-based services requests (e.g., access requests directed to data in data storage service(s) 240, operations, tasks, or jobs, being performed as part of data processing service(s) 230, or to interact with data catalog service 220) to and receive responses from provider network 200 via network 260. In various embodiments, network 260 may encompass any suitable combination of networking hardware and protocols necessary to establish network-based-based communications between clients 250 and provider network 200. For example, network 260 may generally encompass the various telecommunications networks and service providers that collectively implement the Internet. Network 260 may also include private networks such as local area networks (LANs) or wide area networks (WANs) as well as public or private wireless networks. For example, both a given client 250 and provider network 200 may be respectively provisioned within enterprises having their own internal networks. In such an embodiment, network 260 may include the hardware (e.g., modems, routers, switches, load balancers, proxy servers, etc.) and software (e.g., protocol stacks, accounting software, firewall/security software, etc.) necessary to establish a networking link between given client 250 and the Internet as well as between the Internet and provider network 200. It is noted that in some embodiments, clients 250 may communicate with provider network 200 using a private network rather than the public Internet.

Figure 3:
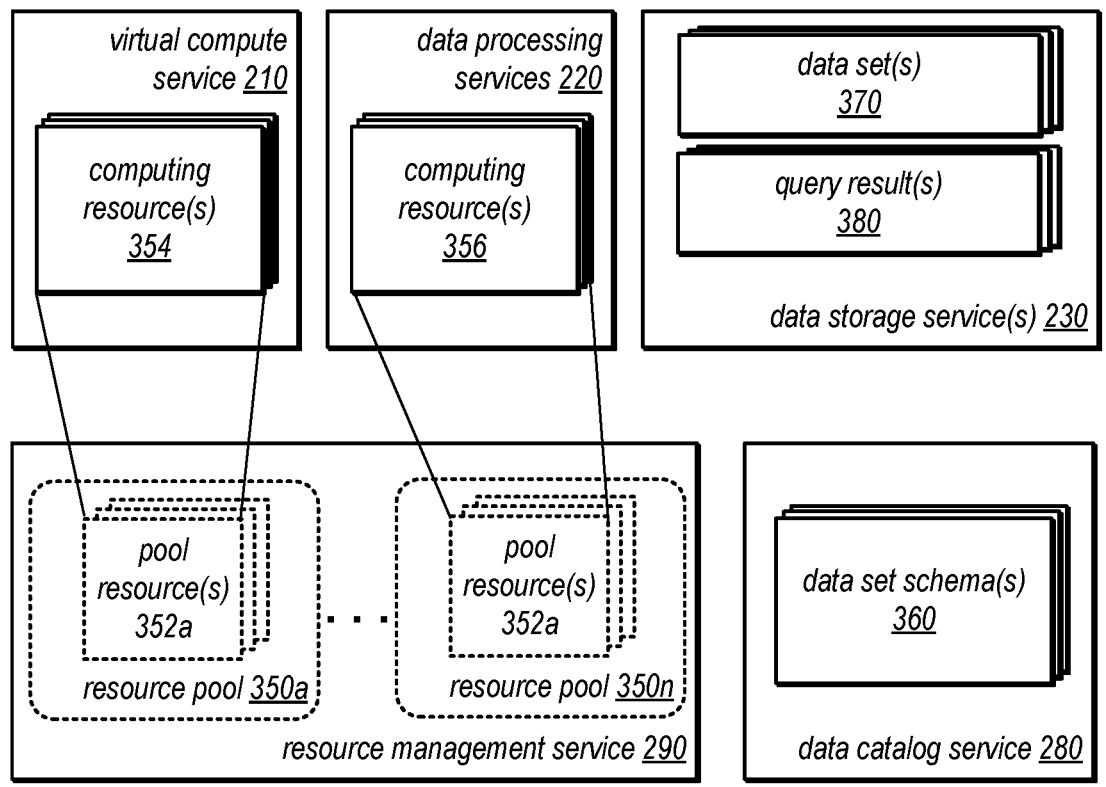
FIG. 3 is a logical block diagram illustrating a data catalog service that dynamically generates data catalogs that provides structural data for accessing data stored in a centralized data store, according to some embodiments.
Figure 3:
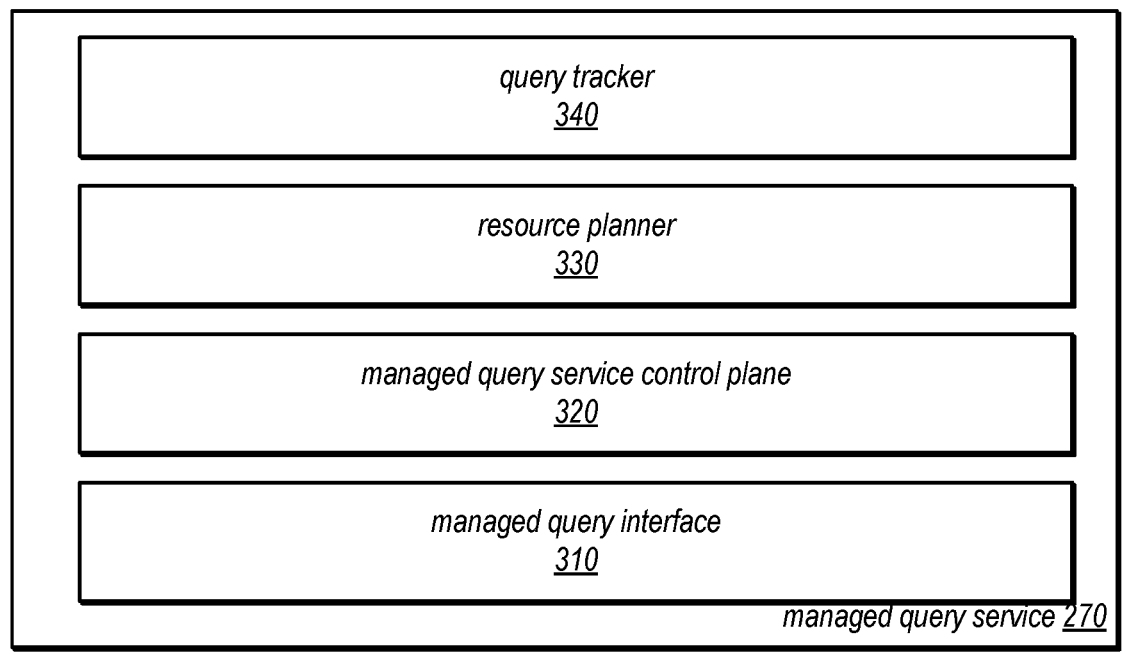

FIG. 3 is a logical block diagram illustrating a managed query service, according to some embodiments. As discussed below with regard to FIGS. 4-8, managed query service 270 may leverage the capabilities of various other services in provider network 200. For example, managed query service 270 may utilize resource management service 290 to provision and manage pools of preconfigured resources to execute queries, provide resources of preconfigured queries, and return utilized resources to availability. For example, resource management service 290 may instantiate, configure, and provide resource pool(s) 350*a* and 350*n* that include pool resource(s) 352*a* and 352*n* from one or more different resource services, such as computing resource(s) 354 in virtual compute service 210 and computing resource(s) 356 in data processing service(s) 220. Resource management service 290 may send requests to create, configure, tag (or otherwise associate) resources 352 for a particular resource pool, terminate, reboot, otherwise operate resources 352 in order to execute jobs on behalf of other network-based services.

Once a resource from a pool is provided (e.g., by receiving an identifier or other indicator of the resource to utilize), managed query service 270 may interact directly with the resource 354 in virtual compute service 210 or the resource 356 in data processing services 220 to execute queries, in various embodiments. Managed query service 270 may utilize data catalog service 280, in some embodiments to store data set schemas 352, as discussed below with regard to FIGS. 4, for subsequent use when processing queries, as discussed below with regard to FIGS. 5-7, in some embodiments. For example, a data set schema may identify the field or column data types of a table as part of a table definition so that a query engine (executing on a computing resource), may be able to understand the data being queried, in some embodiments. Managed query service 270 may also interact with data storage service(s) 230 to directly source data sets 370 or retrieve query results 380, in some embodiments.

Managed query service 270 may implement a managed query interface 310 to handle requests from different client interfaces, as discussed below with regard to FIG. 4. For example, different types of requests, such as requests formatted according to an Application Programmer Interface (API), standard query protocol or connection, or requests received via a hosted graphical user interface implemented as part of managed query service may be handled by managed query interface 310.

Managed query service 270 may implement managed query service control plane 320 to manage the operation of service resources (e.g., request dispatchers for managed query interface 310, resource planner workers for resource planner 330, or query tracker monitors for query tracker 340). Managed query service control plane 320 may direct requests to appropriate components as discussed below with regard to FIGS. 5 and 6. Managed query service 270 may implement authentication and authorization controls for handling requests received via managed query interface 310. For example, managed query service control plane 320 may validate the identity or authority of a client to access the data set identified in a query received from a client (e.g., by validating an access credential). In at least some embodiments, managed query service control plane 320 may maintain (in an internal data store or as part of a data set in an external data store, such as in one of data storage service(s) 230), query history, favorite queries, or query execution logs, and other managed query service historical data. Query execution costs may be billed, calculated or reported by managed query service control plane 320 to a billing service (not illustrated) or other system for reporting usage to users of managed query service, in some embodiments.

Managed query service 270 may implement resource planner 330 to intelligently select available computing resources from pools for execution of queries, in some embodiments. For example, resource planner 330 may evaluated collected data statistics associated with query execution (e.g., reported by computing resources) and determine an estimated number or configuration of computing resources for executing a query within some set of parameters (e.g., cost, time, etc.). For example, machine learning techniques may be applied by resource planner 330 to generate a query estimation model that can be applied to the features of a received query to determine the number/configuration of resources, in one embodiment. Resource planner 330 may then provide or identify which ones of the resources available to execute the query from a pool may best fit the estimated number/configuration, in one embodiment.

In various embodiments, managed query service 270 may implement query tracker 340 in order to manage the execution of queries at compute clusters, track the status of queries, and obtain the resources for the execution of queries from resource management service 290. For example, query tracker 340 may maintain a database or other set of tracking information based on updates received from different managed query service agents implemented on provisioned computing resources (e.g., computing clusters as discussed below with regard to FIGS. 5-7).

Figure 4:
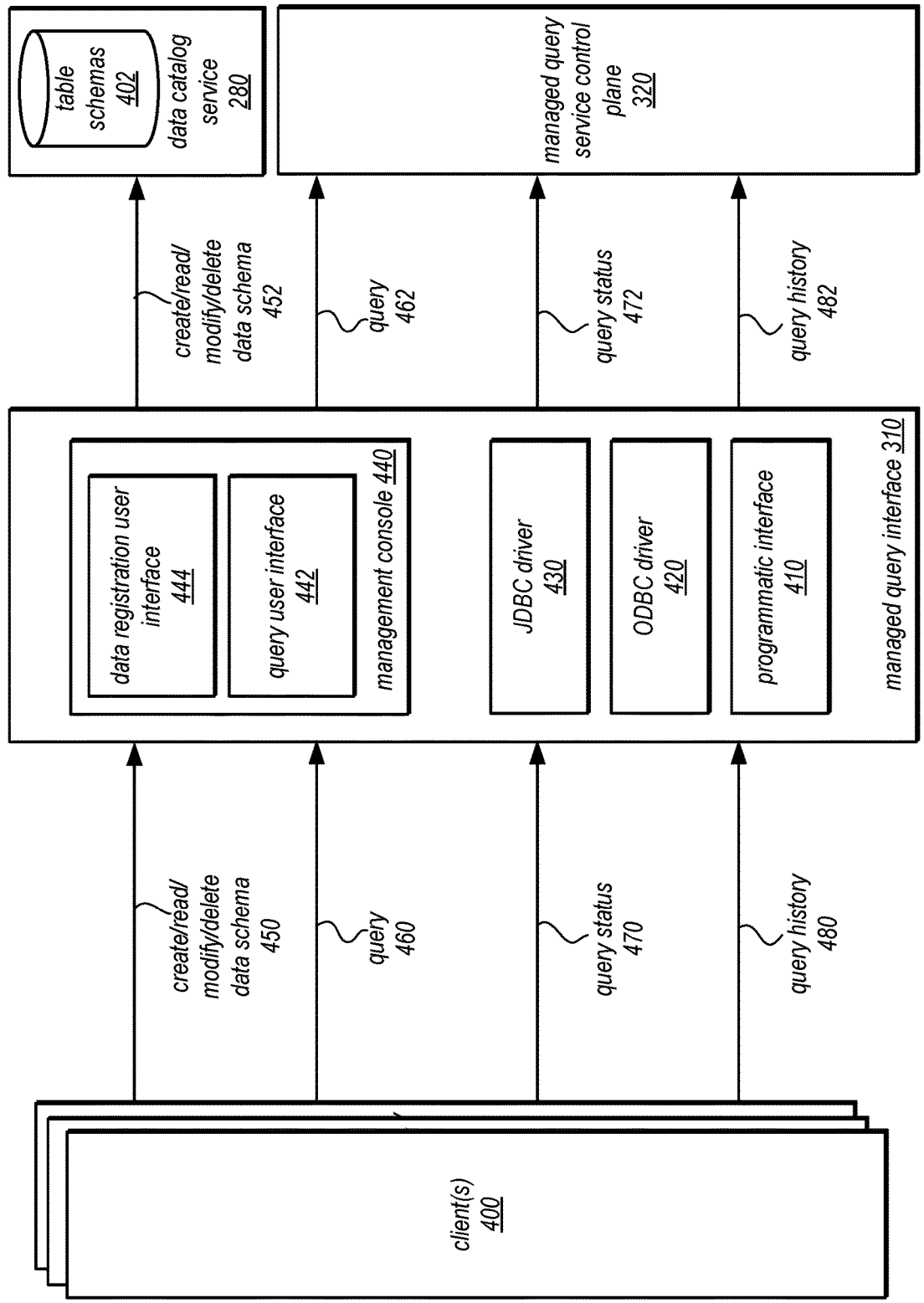
FIG. 4 is a diagram illustrating interactions between clients and managed query service, according to some embodiments.

FIG. 4 is a diagram illustrating interactions between clients and managed query service, according to some embodiments. Client(s) 400 may be client(s) 250 in FIG. 2 above or other clients (e.g., other services systems or components implemented as part of provider network 200 or as part of an external service, system, or component, such as data exploration or visualization tools (e.g., Tableau, Looker, MicroStrategy, Qliktech, or Spotfire). Clients 400 can send various requests to managed query service 270 via managed query interface 310. Managed query interface 310 may offer a management console 440, which may provider a user interface to submit queries 442 (e.g., graphical or command line user interfaces) or register data schemas 444 for executing queries. For example, management console 440 may be implemented as part of a network-based site (e.g., an Internet website for provider network 200) that provides various graphical user interface elements (e.g., text editing windows, drop-down menus, buttons, wizards or workflows) to submit queries or register data schemas. Managed query interface 310 may implement programmatic interfaces 410 (e.g., various Application Programming Interface (API) commands) to perform queries, and various other illustrated requests. In some embodiments, managed query interface 310 may implement custom drivers that support standard communication protocols for querying data, such as JDBC driver 430 or ODBC driver 420.

Clients 400 can submit many different types of request to managed query interface 310. For example, in one embodiment, clients 400 can submit requests 450 to create, read, modify, or delete data schemas. For example, a new table schema can be submitted via a request 450. Request 450 may include a name of the data set (e.g., table), a location of the data set (e.g. an object identifier in an object storage service, such as data storage service 230, file path, uniform resource locator, or other location indicator), number of columns, column names, data types for fields or columns (e.g., string, integer, Boolean, timestamp, array, map, custom data types, or compound data types), data format (e.g., formats including, but not limited to, JSON, CSV, AVRO, ORC, PARQUET, tab delimited, comma separated, as well as custom or standard serializers/desrializers), partitions of a data set (e.g., according to time, geographic location, or other dimensions), or any other schema information for process queries with respect to data sets, in various embodiments. In at least some embodiments, request to create/read/modify/delete data set schemas may be performed using a data definition language (DDL), such as Hive Query Language (HQL). Managed query interface 310 may perform respective API calls or other requests 452 with respect to data catalog service 280, to store the schema for the data set (e.g., as part of table schemas 402). Table schemas 402 may be stored in different formats (e.g., Apache Hive). Note, in other embodiments, managed query service 270 may implement its own metadata store.

Clients 400 may also send queries 460 and query status 470 requests to managed query interface 310 which may direct those requests 460 and 470 to managed query service control plane 320, in various embodiments, as discussed below with regard to FIGS. 5 and 6. Queries 460 may be formatted according to various types of query languages, such as Structured Query Language (SQL) or HQL.

Client(s) 400 may also submit requests for query history 480 or other account related query information (e.g., favorite or common queries) which managed query. In some embodiments, client(s) 400 may programmatically trigger the performance of past queries by sending a request to execute a saved query 490, which managed query service control plane 320 may look-up and execute. For example, execute saved query request may include a pointer or other identifier to a query stored or saved for a particular user account or client. Managed query service control plane 320 may then access that user query store to retrieve and execute the query (according to techniques discussed below with regard to FIGS. 5-7).

Figure 5:
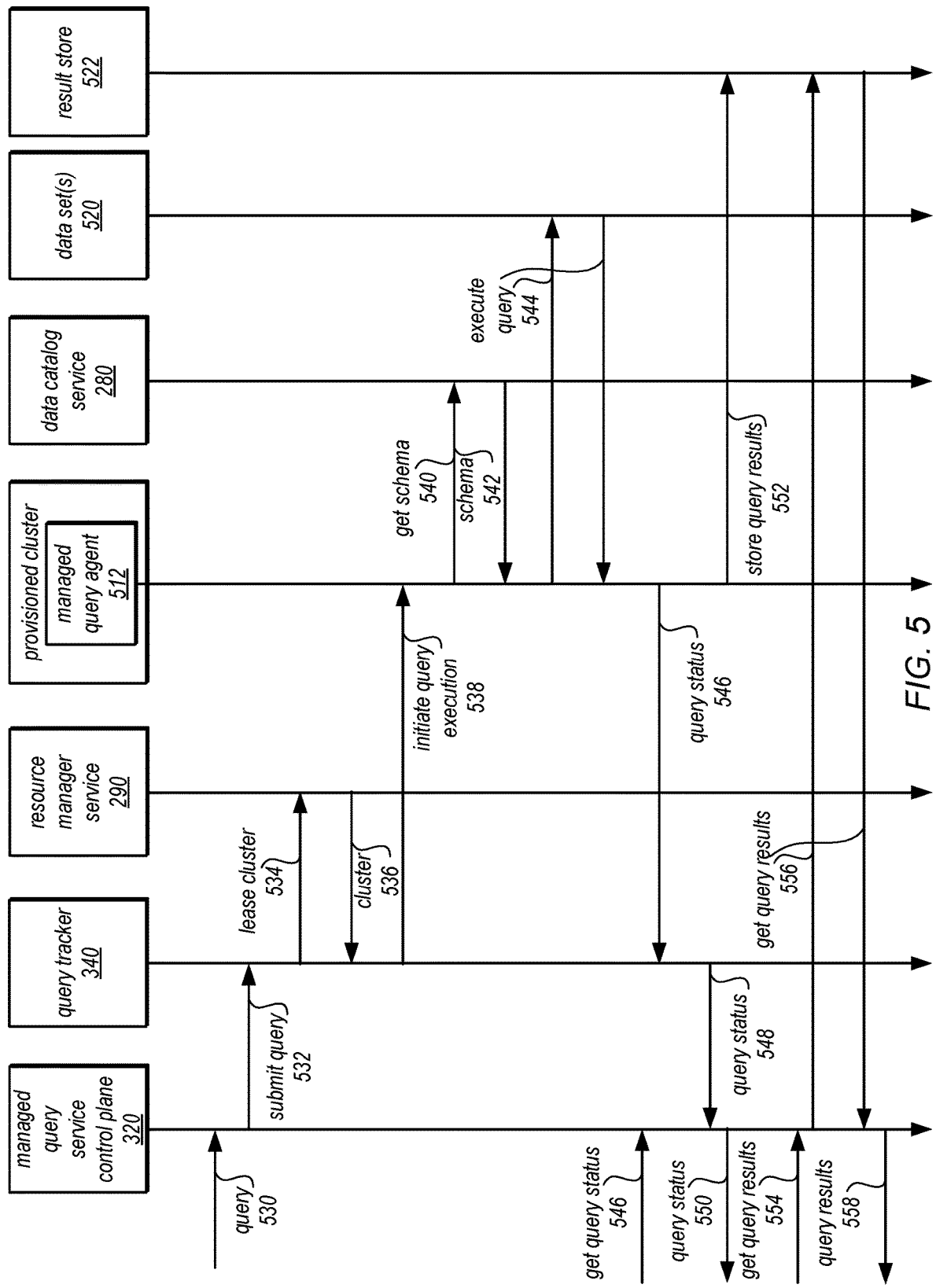
FIG. 5 is a sequence diagram for managed execution of queries, according to some embodiments.

FIG. 5 is a sequence diagram for managed execution of queries, according to some embodiments. Query 530 may be received at managed query service control plane 320 which may submit the query 532 to query tracker 340 indicating the selected cluster 536 for execution. Query tracker 340 may lease a cluster 534 from resource management service 290, which may return a cluster 536. Resource management service 290 and query tracker 340 may maintain lease state information for resources that are leased by query tracker and assigned to execute received queries. Query tracker 340 may then initiate execution of the query 538 at the provisioned cluster 510, sending a query execution instruction to a managed query agent 512.

Managed query agent 512 may get schema 540 for the data sets(s) 520 from data catalog service 280, which may return the appropriate schema 542 (e.g., implementing a technique to apply schema for processing queries "on-read"). Provisioned cluster 510 can then generate a query execution plan and execute the query 544 with respect to data set(s) 520 according to the query plan. Managed query agent 512 may send query status 546 to query tracker 340 which may report query status 548 in response to get query status 546 request, sending a response 550 indicating the query status 550. Provisioned cluster 510 may store the query results 552 in a result store 522 (which may be a data storage service 230). Managed query service control plane 320 may receive q request to get a query results 554 and get query results 556 from results store 522 and provide the query results 558 in response, in some embodiments.

Figure 6:
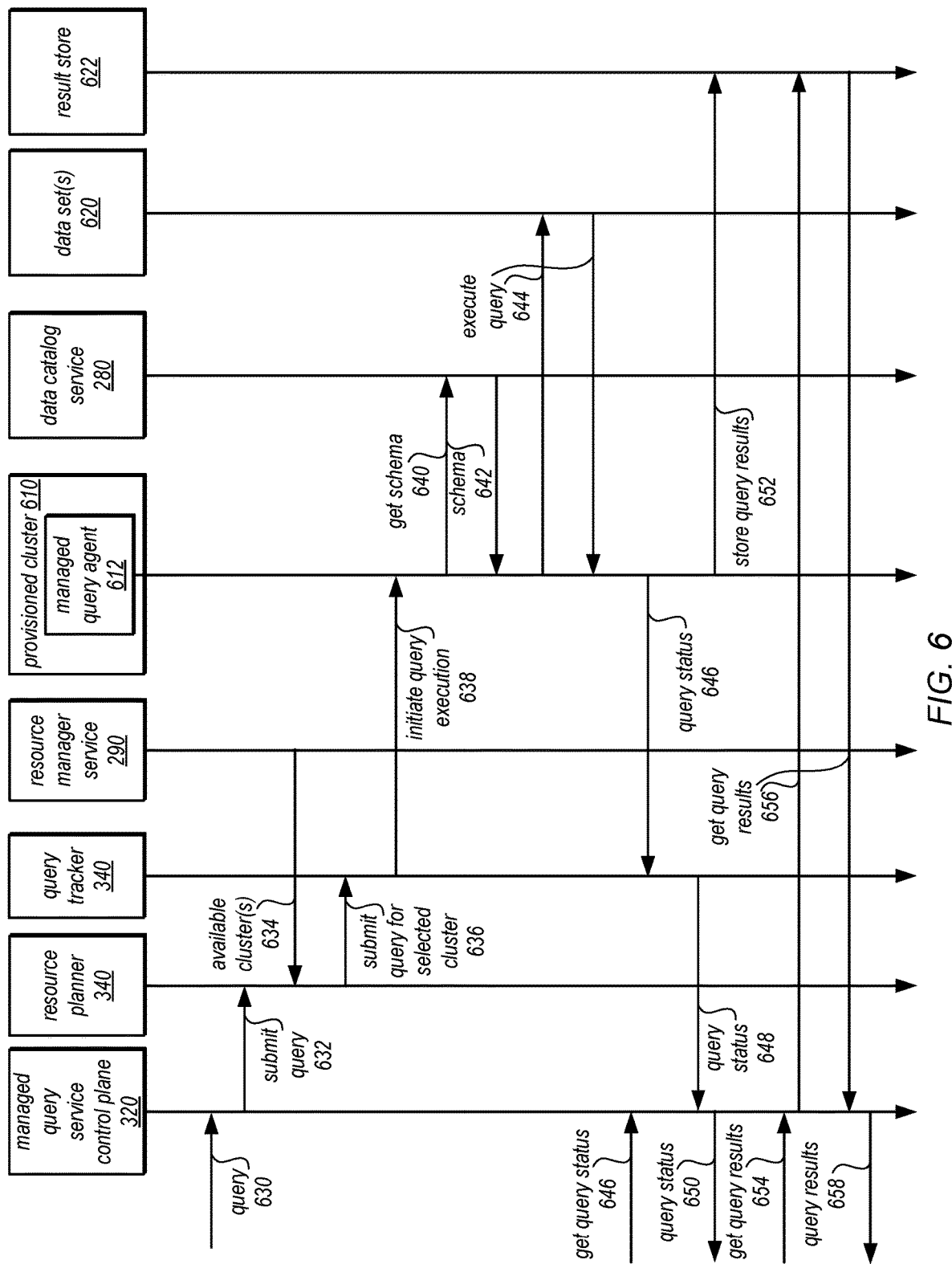
FIG. 6 is a sequence diagram for managed execution of queries utilizing a resource planner, according to some embodiments.

FIG. 6 is a sequence diagram for managed execution of queries utilizing a resource planner, according to some embodiments. Query 630 may be received at managed query service control plane 320 which may submit the query 632 to resource planner 340. Resource planner 340 may analyze the query to determine the optimal cluster to process the query based on historical data for processing queries and available cluster(s) 634 received from resource management service 290. Resource planner 340 may then select a query and submit the query to query tracker 340 indicating the selected cluster 636 for execution. Query tracker 340 may then initiate execution of the query 638 at the provisioned cluster 610, sending a query execution instruction to a managed query agent 612.

Managed query agent 612 may get schema 640 for the data sets(s) 620 from data catalog service 280, which may return the appropriate schema 642. Provisioned cluster 610 can then generate a query execution plan and execute the query 644 with respect to data set(s) 620 according to the query plan. Managed query agent 612 may send query status 646 to query tracker 340 which may report query status 648 in response to get query status 646 request, sending a response 650 indicating the query status 650. Provisioned cluster 610 may store the query results 652 in a result store 622 (which may be a data storage service 230). Managed query service control plane 320 may receive q request to get a query results 654 and get query results 656 from results store 622 and provide the query results 658 in response, in some embodiments.

Figure 7:
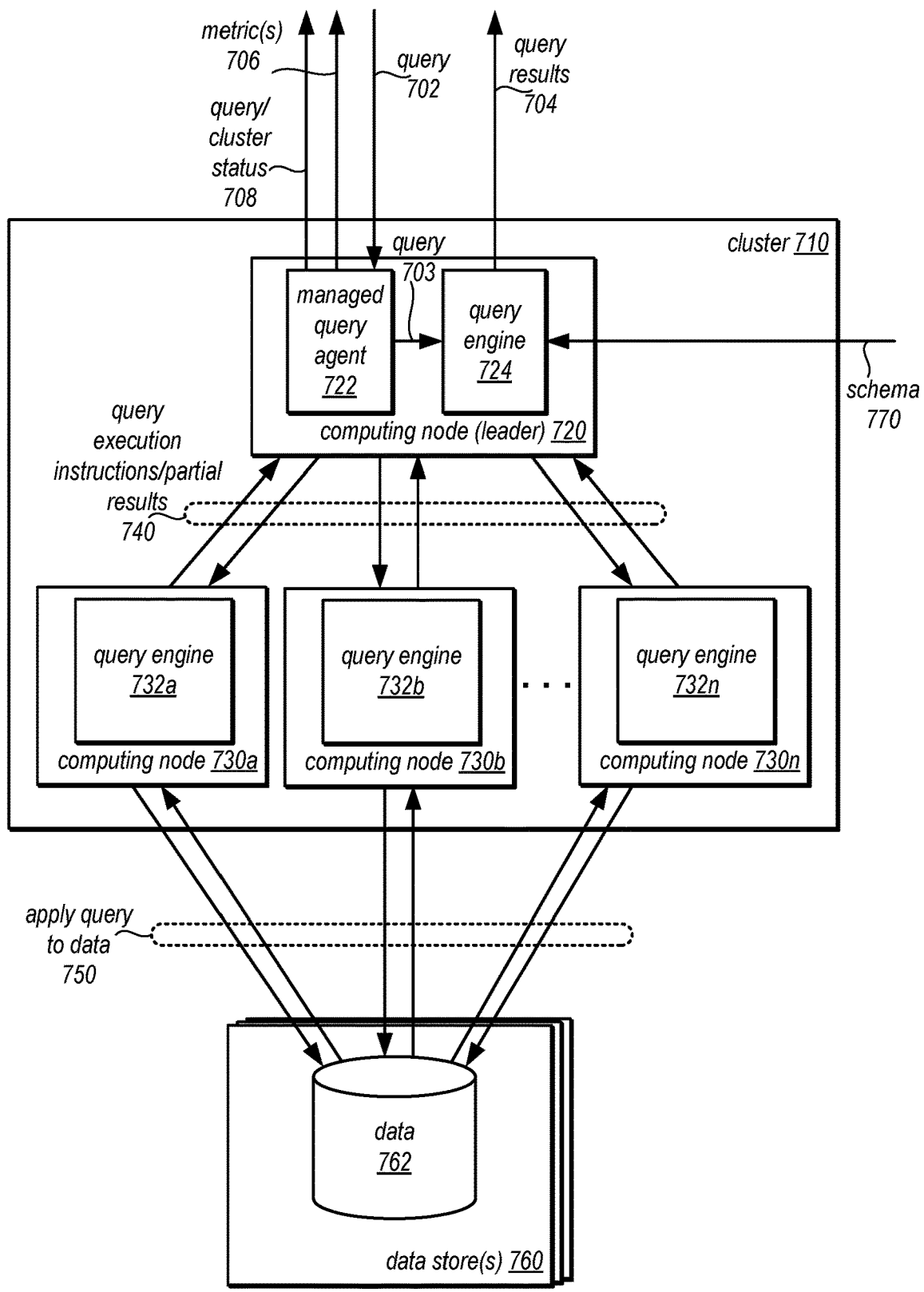
FIG. 7 is a logical block diagram illustrating a cluster processing a query as part of managed query execution, according to some embodiments.

Different types of computing resources may be provisioned and configured in resource pools, in some embodiments. Single-node clusters or multi-node compute clusters may be one example of a type of computing resource provisioned and configured in resource pools by resource management service 290 to service queries for managed query service 270. FIG. 7 is a logical block diagram illustrating a cluster processing a query as part of managed query execution, according to some embodiments. Cluster 710 may implement a computing node 720 that is a leader node (according to the query engine 724 implemented by cluster 710). In some embodiments, no single node may be a leader node, or the leader node may rotate from processing one query to the next. Managed query agent 722 may be implemented as part of leader node 720 in order to provide an interface between the provisioned resource, cluster 710, and other components of managed query service 270 and resource management service 290. For example, managed query agent 722 may provide further data to managed query service 270, such as the status 708 of the query (e.g. executing, performing I/O, performing aggregation, etc.,) and metrics 706 (e.g., health metrics, resource utilization metrics, cost metrics, length of time, execution metrics, etc.). In some embodiments, managed query agent 722 may provide cluster/query status 708 and metric(s) 706 to resource management service 290 (in order to make pool management decisions, such as modification events, lease requests, etc.). For example, managed query agent 722 may indicate cluster status 708 to resource management service 290 indicating that a query has completed and that the cluster 710 is ready for reassignment (or other resource lifecycle operations, as discussed below with regard to FIG. 10).

Leader node 720 may implement query engine 724 to execute queries, such as query 702 which may be received via managed query agent 722 as query 703. For instance, managed query agent may implement a programmatic interface for query tracker to submit queries (as discussed above in FIGS. 5 and 6), and then generate and send the appropriate query execution instruction to query engine 724. Query engine 724 may generate a query execution plan for received queries 703. In at least some embodiments, leader node 720, may obtain schema information for the data set(s) 770 from the data catalog service 280 or metadata stores for data 762 (e.g., data dictionaries, other metadata stores, other data processing services, such as database systems, that maintain schema information) for data 762, in order to incorporate the schema data into the generation of the query plan and the execution of the query. Leader node 720 may generate and send query execution instructions 740 to computing nodes that access and apply the query to data 762 in data store(s) 760. Compute nodes, such as nodes 730*a*, 730*b*, and 730*n*, may respectively implement query engines 732*a*, 732*b*, and 732*n* to execute the query instructions, apply the query to the data 750, and return partial results 740 to leader node 720, which in turn may generate and send query results 704. Query engine 724 and query engines 732 may implement various kinds of distributed query or data processing frameworks, such as the open source Presto distributed query framework or the Apache Spark framework.

Figure 8:
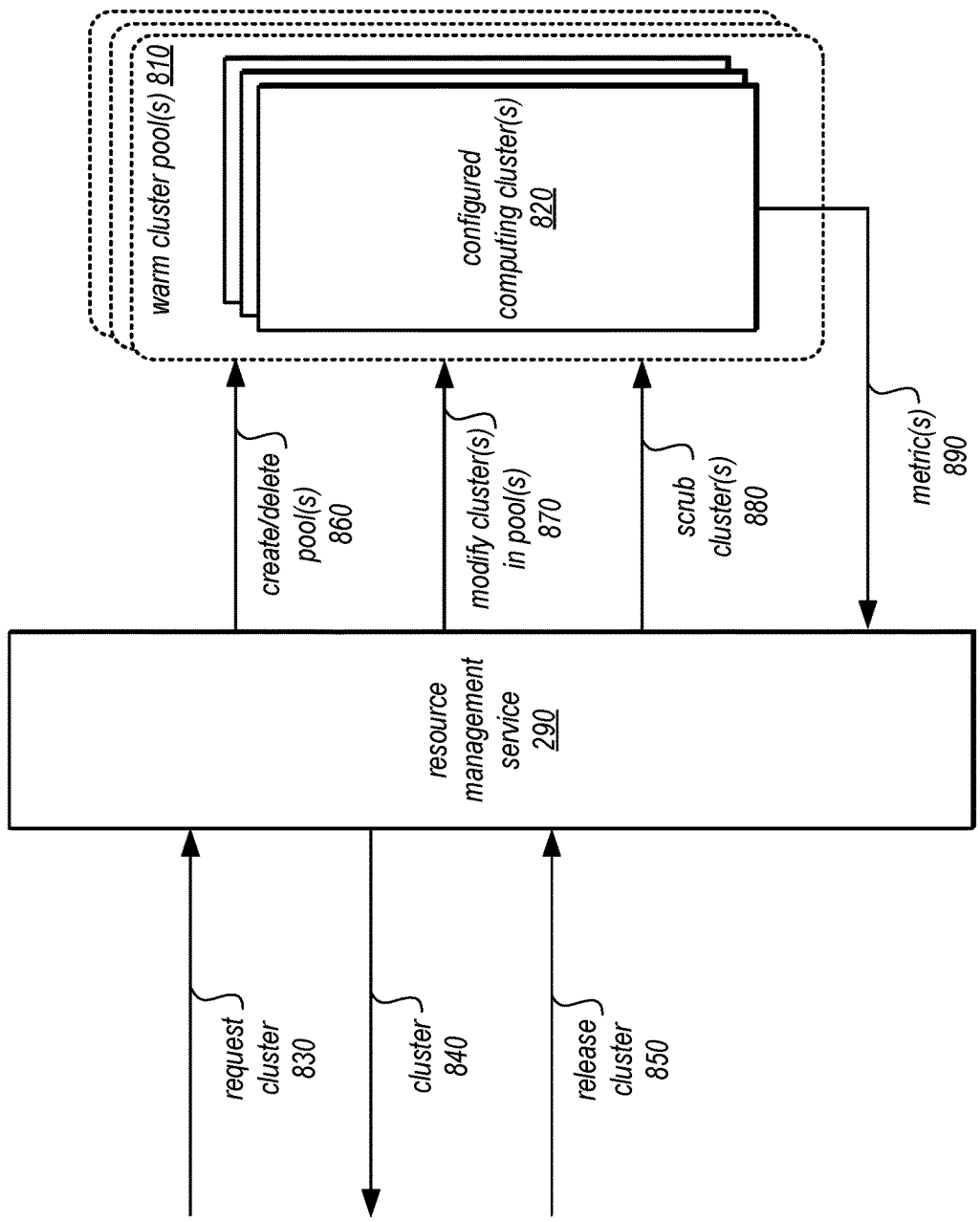
FIG. 8 is logical block diagram illustrating interactions between a resource management service and pools of resources, according to some embodiments.

FIG. 8 is logical block diagram illustrating interactions between a resource management service and pools of resources, according to some embodiments. Resource management service 290 may implement a programmatic interface (e.g., API) or other interface that allows other network-based services (or a client or a provider network) to submit requests for preconfigured resources from a resource pool managed by resource management service 290. For example, a request for a cluster 830 may be received (e.g., from query tracker 340) to obtain a cluster to execute a query. Resource management service 290 may determine the appropriate pool for the request 830, a randomly (or selectively according to the techniques discussed below with regard to FIG. 10) determine a cluster for servicing the request. Resource management service 290 may then provide the identified cluster 840 (e.g., by specifying a location, identifier, or other information for accessing the identified computing resource. Resource management service may update state information for the cluster to indicate that the cluster is leased or otherwise unavailable. Resource management service 290 may also receive requests to release a cluster 850 from a current assignment. Resource management service 290 may then update state information for the cluster and pool to return the cluster to the pool, in some embodiments.

As indicated at 860, resource management service 290 may automatically (or in response to requests (not illustrated)), commission or decommission pool(s) of clusters 810. For example in some embodiments, resource management service 290 may perform techniques that select the number and size of computing clusters 820 for the warm cluster pool 810. The number and size of the computing clusters 820 in the warm cluster pool 810 can be determined based upon a variety of factors including, but not limited to, historical and/or expected volumes of query requests, the price of the computing resources utilized to implement the computing clusters 820, and/or other factors or considerations, in some embodiments.

Once the number and size of computing clusters 820 has been determined, the computing clusters 820 may be instantiated, such as through the use of an on-demand computing service, or virtual compute service or data processing service as discussed above in FIG. 2. The instantiated computing clusters 820 can then be configured to process queries prior to receiving the queries at the managed query service. For example, and without limitation, one or more distributed query frameworks or other query processing engines can be installed on the computing nodes in each of the computing clusters 820. As discussed above, in one particular implementation, the distributed query framework may be the open source PRESTO distributed query framework. Other distributed query frameworks can be utilized in other configurations. Additionally, distributed processing frameworks or other query engines can also be installed on the host computers in each computing cluster 820. As discussed above, the distributed processing frameworks can be utilized in a similar fashion to the distributed query frameworks. For instance, in one particular configuration, the APACHE SPARK distributed processing framework can also, or alternately, be installed on the host computers in the computing clusters 820.

Instantiated and configured computing clusters 820 that are available for use by the managed query service 104 are added to the warm cluster pool 810, in some embodiments. A determination can be made as to whether the number or size of the computing clusters 820 in the warm cluster pool needs is to be adjusted, in various embodiments. The performance of the computing clusters 820 in the warm cluster pool 810 can be monitored based on metric(s) 890 received from the cluster pool. The number of computing clusters 820 assigned to the warm cluster pool 810 and the size of each computing cluster 820 (i.e. the number of host computers in each computing cluster 820) in the warm cluster pool 810 can then be adjusted. Such techniques can be repeatedly performed in order to continually optimize the number and size of the computing clusters 820 in the warm cluster pool 810.

As indicated at 880, in some embodiments, resource management service may scrub clusters(s) 880, by causing the cluster to perform operations (e.g., a reboot) so that the cluster no longer retains client data and is ready to process another query. For example, resource management service 290 may determine whether a computing cluster 820 is inactive (e.g. the computing cluster 820 has not received a query in a predetermined amount of time). If resource management service 290 determines that the computing cluster 820 is inactive, then the computing cluster 820 may be disassociated from the submitter of the query. The computing cluster may then be "scrubbed," such as by removing data associated with the submitter of the queries from memory (e.g. main memory or a cache) or mass storage device (e.g. disk or solid state storage device) utilized by the host computers in the computing cluster 820. The computing cluster 820 may then be returned to the warm cluster pool 810 for use in processing other queries. In some embodiments, some clusters that are inactive might not be disassociated from certain users in certain scenarios. In these scenarios, the user may have a dedicated warm pool of clusters 810 available for their use.

Figure 9:
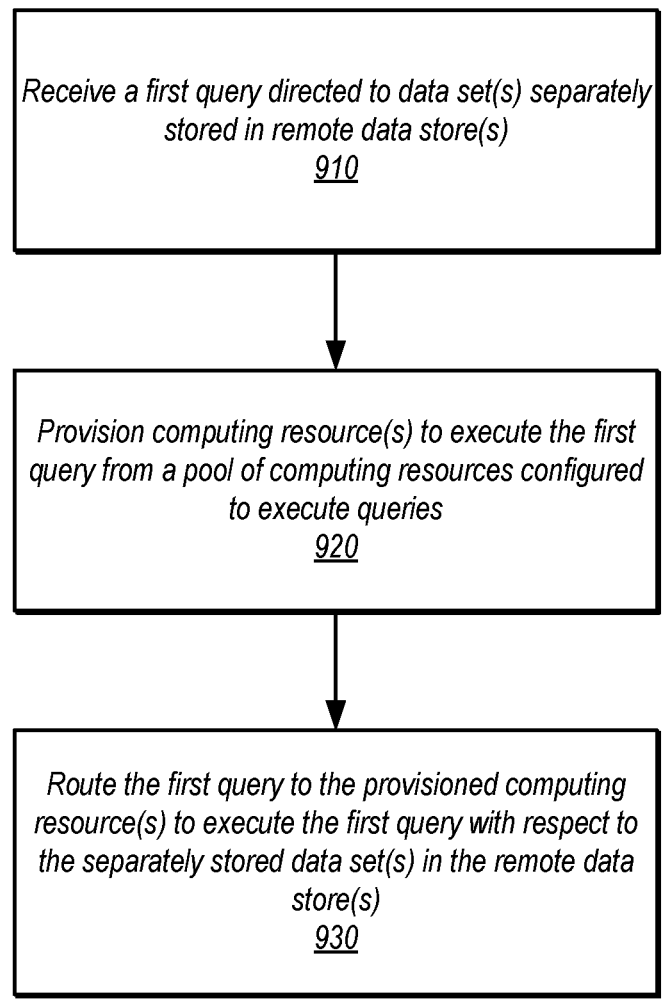
FIG. 9 is a high-level flowchart illustrating various methods and techniques to implement managed query execution, according to some embodiments.

Although FIGS. 2-8 have been described and illustrated in the context of a provider network leveraging multiple different services to implement a managed query service, the various components illustrated and described in FIGS. 2-8 may be easily applied to other managed query execution techniques, systems, or devices that manage the execution of queries with respect to data sets stored in remote data stores and/or in different formats. As such, FIGS. 2-8 are not intended to be limiting as to other embodiments of a system that may implement managed query execution. FIG. 9 is a high-level flowchart illustrating various methods and techniques to implement managed query execution, according to some embodiments. Various different systems and devices may implement the various methods and techniques described below, either singly or working together. For example, a data processing service and/or storage service, along with a data catalog service and managed query service such as described above with regard to FIGS. 2-8 may implement the various methods. Alternatively, a combination of different systems and devices may implement these methods. Therefore, the above examples and or any other systems or devices referenced as performing the illustrated method, are not intended to be limiting as to other different components, modules, systems, or configurations of systems and devices.

As indicated at 910, a first query may be received that is directed to data set(s) separately stored in remote data stores, in various embodiments. For example, a query may be received via the various types of interfaces described above with regard to FIG. 4 (programmatic, user console, driver, etc.), in one embodiment. A query may be formatted according to different query languages, or specifications of query languages including Structured Query Language (SQL) and/or Hive Query Language (HQL). The query may include execution hints, specifying the type of query execution engine to utilize, query execution limits, or other parameters or properties for configuring the execution of the query, in some embodiments.

As indicated at 920, computing resource(s) to execute the first query may be received from a pool of computing resources configured to execute queries. As discussed above, the pools of computing resources may be warm, or otherwise previously configured, so that they are ready to receive and being processing queries. The computing resources may be configured using different query execution engines, including different distributed query processing frameworks such as Presto or Spark. Computing resources may be provisioned by randomly selecting an available computing resource from an identified pool (e.g., a pool of computing resources configured to execute the type of received query, such as discussed below with regard to FIG. 10), or may deterministically select a computing resource for a pool based on analysis of the computing resource's properties, or may select a computing resource that is already executing another query on behalf of a same submitter of the first query (e.g., a same client, same user, same account, same credentials, etc.).

As indicated at 930, the first query may be routed to the provisioned computing resource(s) to execute the first query with respect to the separately stored data set(s) in the remote data store(s), in various embodiments. For example, a request may formatted and sent to a managed cluster agent, indicating the query to execute, configuration parameters for the execution of the query, or a location or destination to send results of the query, in some embodiments. In at least some embodiments, the query may be directly sent to the query engine.

Figure 10:
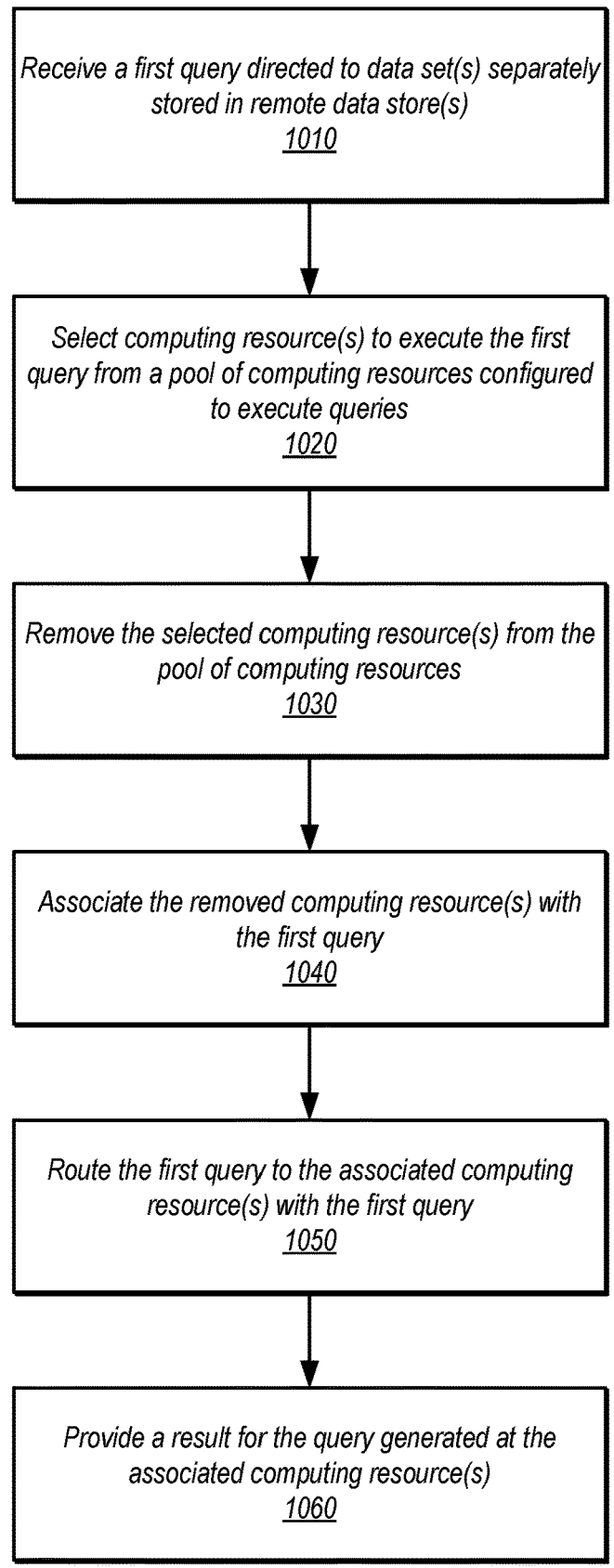
FIG. 10 is a high-level flowchart illustrating various methods and techniques to select computing resources from a pool of computing resources to execute a query, according to some embodiments.

FIG. 10 is a high-level flowchart illustrating various methods and techniques to select computing resources from a pool of computing resources to execute a query, according to some embodiments. As indicated at 1010, a first query directed to data set(s) stored in remote data stores may be received, in various embodiments. As indicated at 1020, computing resource(s) may be selected from a pool of computing resources configured to execute queries may be selected. For example, a pool for executing the query may be determined, in some embodiments according to the type of query (e.g., read query, write query, schema change or other data definition language (DDL) based query. In some embodiments, different sizes of computing resources may be available, and thus a computing resource may be selected on an optimal (or client-specified size) for the query. Different types of query engines may be implemented on different computing resources in different pools, in some embodiments. A resource may be selected based on the type of query engine, (e.g., read query may lead to a selection of a memory-based query engine, while a write query may lead to the selection of a memory and disk operable query engine). In at least some embodiments, the selected resource may come from a resource pool identified as a warm cluster pool for performing the received query. In some embodiments, the selection of the computing resource (e.g., a computing cluster) for performing the query can be based upon a number of factors including, but not limited to, previous queries submitted by the same requestor, desired query performance, user preferences, the amount of data to be queried, column statistics, empirical data, the price of the computing resources utilized to perform the query, other types of statistics relating to the performance of the clusters 106, and others. In some embodiments, the computing resources may be selected again for subsequent queries received from the same submitter to the selected computing resources.

As indicated at 1030, once selected, the selected computing clusters may be removed from the pool of computing resources (e.g., a cluster from the warm cluster pool). As indicated at 1040, the removed computing resource(s) may be associated with the first query (or submitter of the first query so that later requests from the submitter may be assigned to the same computing resources, in some embodiments), in various embodiments. Computing resources can also be associated with a user at another time, such as when a user logs into a management console. As indicated at 1050, the first query may then be routed to the associated computing resource(s) with the first query, in various embodiments. As indicated at 1060, a result for the query generated at the associated computing resources can be provided, in various embodiments. For example, the results can be sent to a destination or location specified for the query results (e.g., in a client request), in one embodiment. The results may be streamed back or aggregated (e.g., in a data store, like data storage service 230) and provided as a batch (or batches, such as paginated results) via a same interface (e.g., programmatic, graphical, driver, console, etc.) that received the query.

Figure 11:
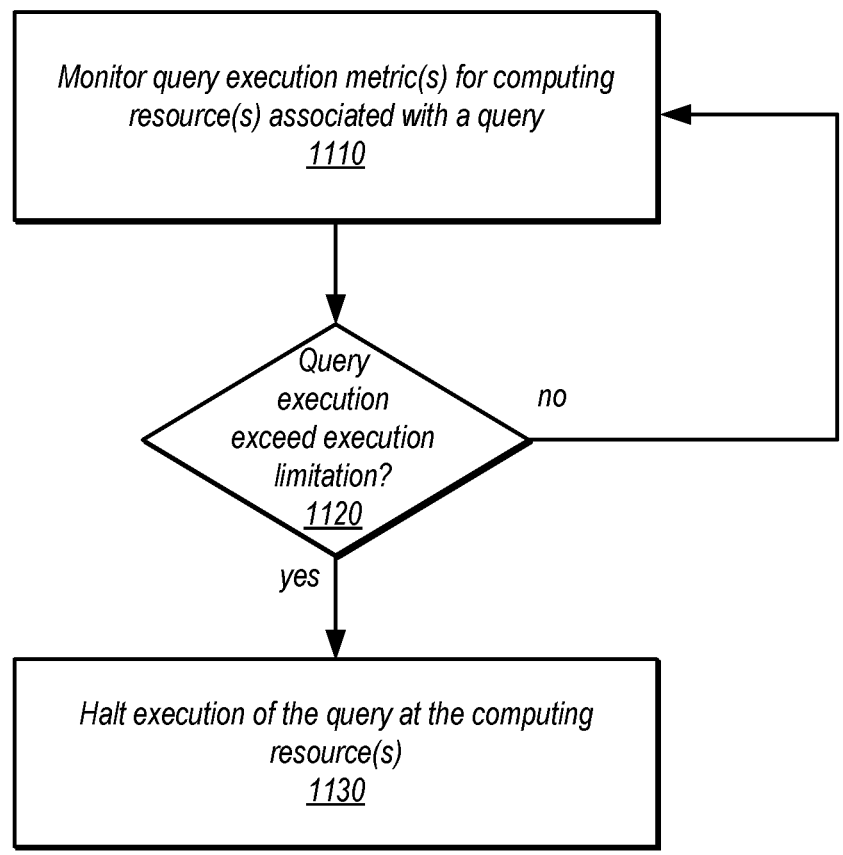
FIG. 11 is a high-level flowchart illustrating various methods and techniques to monitor execution of a query with respect to a query execution limitation, according to some embodiments.

FIG. 11 is a high-level flowchart illustrating various methods and techniques to monitor execution of a query with respect to a query execution limitation, according to some embodiments. As indicated at 1110, query execution metric(s) may be monitored for computing resource(s) associated with a query, in various embodiments. For example, query execution metrics may include utilization or consumption metrics (e.g., I/O bandwidth consumed, processor capacity consumed, network bandwidth, consumed), in one embodiments. In one embodiment, query execution metrics may be cost values derived from utilization or consumption metrics (e.g., in terms of work units, monetary units, time units, etc.).

As indicated at 1120, the monitored query execution metrics may be evaluated with respect to a query execution limitation, in some embodiments. For example, a query may include an execution limitation as a hint, comment, or other "non-executable" portion of a query statement, which may indicate the limitation to apply to the query, in one embodiment. In some embodiments, default cost, unit, utilization, or other consumption limitations may be applied, or in other embodiments, an execution time limit may be applied. If the query execution limitation is exceeded, as indicated by the positive exit from 1120, then execution of the query may be halted at the computing resource(s), in various embodiments. For example, partial results or other completed work may be provided as a query result (and may in some embodiments indicated that the result is partial or a halted query due to query execution limitation). An on-resource agent or component may perform monitoring and/or halting of query execution (e.g., managed query agent 722 in FIG. 7), or a separate monitoring component (e.g., at query tracker 340 in FIG. 3) may monitor query execution metrics and cause the halt of the execution of the query.

Figure 12:
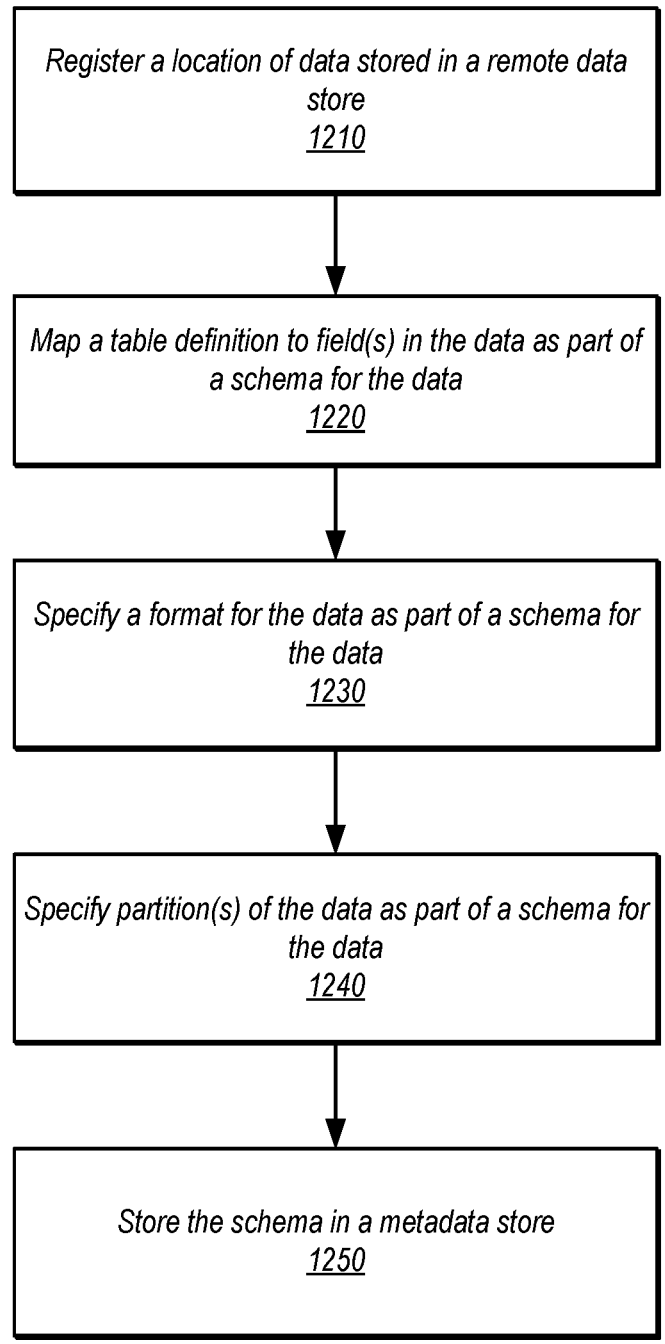
FIG. 12 is a high-level flowchart illustrating various methods and techniques to store a schema for data stored in a remote data store, according to some embodiments.

FIG. 12 is a high-level flowchart illustrating various methods and techniques to store a schema for data stored in a remote data store, according to some embodiments. As indicated at 1210, a location of data stored in a remote data store may be registered, in some embodiments. For example, in one embodiment, a file path, object identifier, data storage service, network address, or other identifier may be provided that indicates a data set location, name, access controls or other information needed to access the data, in one embodiment. As indicated at 1220, a table definition may be mapped to field(s) in the data as part of a schema for the data, in some embodiments. For example, standard data types, such as integers, strings, floats, or chars, custom or compound data types, such as dates, uniform resource locators (URLs), gender, etc., may be mapped to different columns of a table.

As indicated at 1230, a format for the data may be specified as part of the schema for the data, in various embodiments. For example, various data formats for how the data is stored, including but not limited Avro, CSV, TSV, Parquet, ORC, JSON, Apache Web Server logs, custom delimiters, and including serializers/deserializers for the data formats, may be specified in a request, in one embodiment. As indicated at 1240, partitions of the data may be specified as part of a schema for the data. For example, the data may be stored in a remote data store in partitions based on time or another dimension, in one embodiment. As indicated at 1250, the schema may be stored in a metadata store, in various embodiments. For example, a managed query service performing the above techniques may utilize an interface, such as data registration UI 444 to store a table definition or other schema utilizing an interface for data catalog service 280. In some embodiments, schemas may be stored according to APACHE HIVE metadata store. However, in other embodiments, other types of formats or metadata stores can be utilized. Once stored in the metadata store, the schema may be made available for processing queries directed to the registered data, in some embodiments. For example, data catalog service 280 can also make a table definition for data available to computing clusters utilized by a managed query service, in one embodiment.

The methods described herein may in various embodiments be implemented by any combination of hardware and software. For example, in one embodiment, the methods may be implemented by a computer system (e.g., a computer system as in FIG. 15) that includes one or more processors executing program instructions stored on a computer-readable storage medium coupled to the processors. The program instructions may be configured to implement the functionality described herein (e.g., the functionality of various servers and other components that implement the network-based virtual computing resource provider described herein). The various methods as illustrated in the figures and described herein represent example embodiments of methods. The order of any method may be changed, and various elements may be added, reordered, combined, omitted, modified, etc.

Figure 13:
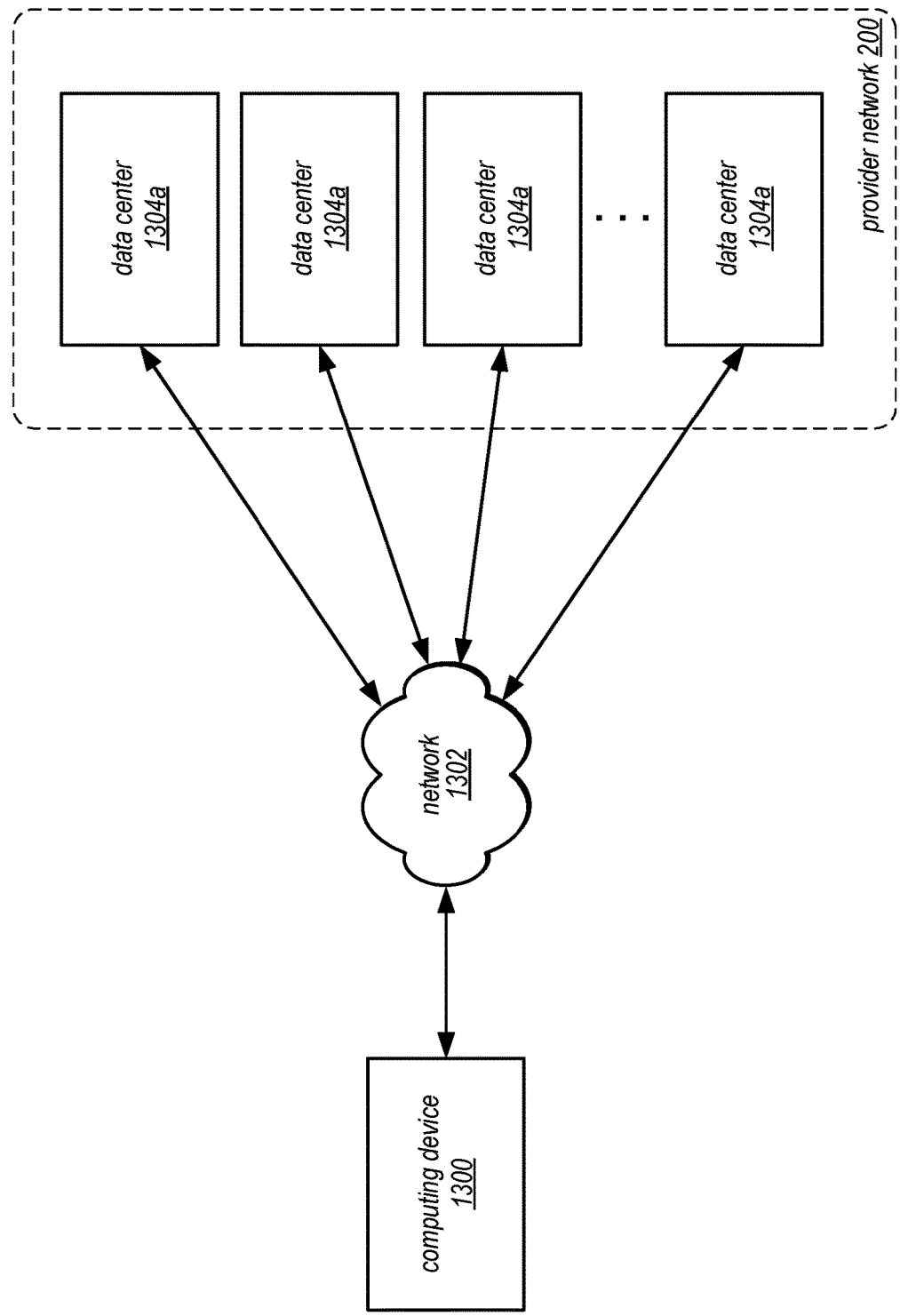
FIG. 13 is a logical block diagram that shows an illustrative operating environment that includes a service provider network that can be configured to implement aspects of the functionality described herein, according to some embodiments.

FIG. 13 is a logical block diagram that shows an illustrative operating environment that includes a service provider network that can implement aspects of the functionality described herein, according to some embodiments. As discussed above, the service provider network 200 can provide computing resources, like VM instances and storage, on a permanent or an as-needed basis. Among other types of functionality, the computing resources provided by the service provider network 200 can be utilized to implement the various services described above. As also discussed above, the computing resources provided by the service provider network 200 can include various types of computing resources, such as data processing resources like VM instances, data storage resources, networking resources, data communication resources, network services, and the like.

Each type of computing resource provided by the service provider network 200 can be general-purpose or can be available in a number of specific configurations. For example, data processing resources can be available as physical computers or VM instances in a number of different configurations. The VM instances can execute applications, including web servers, application servers, media servers, database servers, some or all of the services described above, and/or other types of programs. The VM instances can also be configured into computing clusters in the manner described above. Data storage resources can include file storage devices, block storage devices, and the like. The service provider network 200 can also provide other types of computing resources not mentioned specifically herein.

The computing resources provided by the service provider network maybe implemented, in some embodiments, by one or more data centers 1304A-1304N (which might be referred to herein singularly as "a data center 1304" or in the plural as "the data centers 1304"). The data centers 1304 are facilities utilized to house and operate computer systems and associated components. The data centers 1304 typically include redundant and backup power, communications, cooling, and security systems. The data centers 1304 can also be located in geographically disparate locations. One illustrative configuration for a data center 1304 that can be utilized to implement the technologies disclosed herein will be described below with regard to FIG. 14.

The customers and other users of the service provider network 200 can access the computing resources provided by the service provider network 200 over a network 1302, which can be a wide area communication network ("WAN"), such as the Internet, an intranet or an Internet service provider ("ISP") network or a combination of such networks. For example, and without limitation, a computing device 1300 operated by a customer or other user of the service provider network 200 can be utilized to access the service provider network 200 by way of the network 1302. It should be appreciated that a local-area network ("LAN"), the Internet, or any other networking topology known in the art that connects the data centers 1304 to remote customers and other users can be utilized. It should also be appreciated that combinations of such networks can also be utilized.

Figure 14:
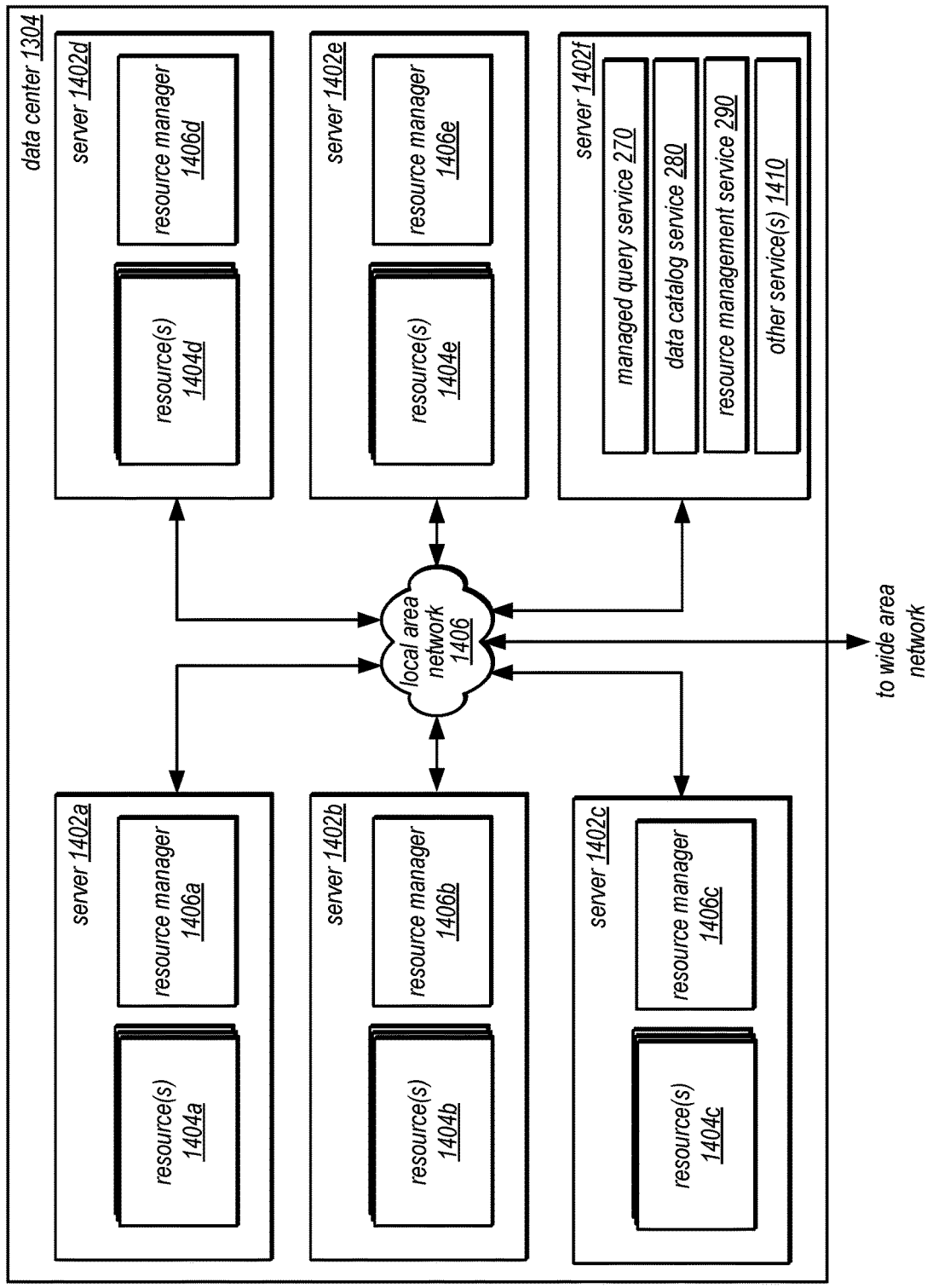
FIG. 14 is a logical block diagram illustrating a configuration for a data center that can be utilized to implement aspects of the technologies disclosed herein, according to some embodiments.

FIG. 14 is a logical block diagram illustrating a configuration for a data center that can be utilized to implement aspects of the technologies disclosed herein, according to various embodiments. is a computing system diagram that illustrates one configuration for a data center 1304 that implements aspects of the technologies disclosed herein for providing managed query execution, such as managed query execution service 270, in some embodiments. The example data center 1304 shown in FIG. 14 includes several server computers 1402A-1402F (which might be referred to herein singularly as "a server computer 1402" or in the plural as "the server computers 1402") for providing computing resources 1404A-1404E.

The server computers 1402 can be standard tower, rackmount, or blade server computers configured appropriately for providing the computing resources described herein (illustrated in FIG. 14 as the computing resources 1404A-1404E). As mentioned above, the computing resources provided by the provider network 200 can be data processing resources such as VM instances or hardware computing systems, computing clusters, data storage resources, database resources, networking resources, and others. Some of the servers 1402 can also b execute a resource manager 1406 capable of instantiating and/or managing the computing resources. In the case of VM instances, for example, the resource manager 1406 can be a hypervisor or another type of program may enable the execution of multiple VM instances on a single server computer 1402. Server computers 1402 in the data center 1304 can also provide network services and other types of services, some of which are described in detail above with regard to FIG. 2.

The data center 1304 shown in FIG. 14 also includes a server computer 1402F that can execute some or all of the software components described above. For example, and without limitation, the server computer 1402F can execute various components for providing different services of a provider network 200, such as the managed query service 270, the data catalog service 280, resource management service 290, and other services 1410 (e.g., discussed above) and/or the other software components described above. The server computer 1402F can also execute other components and/or to store data for providing some or all of the functionality described herein. In this regard, it should be appreciated that the services illustrated in FIG. 14 as executing on the server computer 1402F can execute on many other physical or virtual servers in the data centers 1304 in various configurations.

In the example data center 1304 shown in FIG. 14, an appropriate LAN 1406 is also utilized to interconnect the server computers 1402A-1402F. The LAN 1406 is also connected to the network 1302 illustrated in FIG. 13. It should be appreciated that the configuration and network topology described herein has been greatly simplified and that many more computing systems, software components, networks, and networking devices can be utilized to interconnect the various computing systems disclosed herein and to provide the functionality described above. Appropriate load balancing devices or other types of network infrastructure components can also be utilized for balancing a load between each of the data centers 1304A-1304N, between each of the server computers 1402A-1402F in each data center 1304, and, potentially, between computing resources in each of the data centers 1304. It should be appreciated that the configuration of the data center 1304 described with reference to FIG. 14 is merely illustrative and that other implementations can be utilized.

Figure 15:
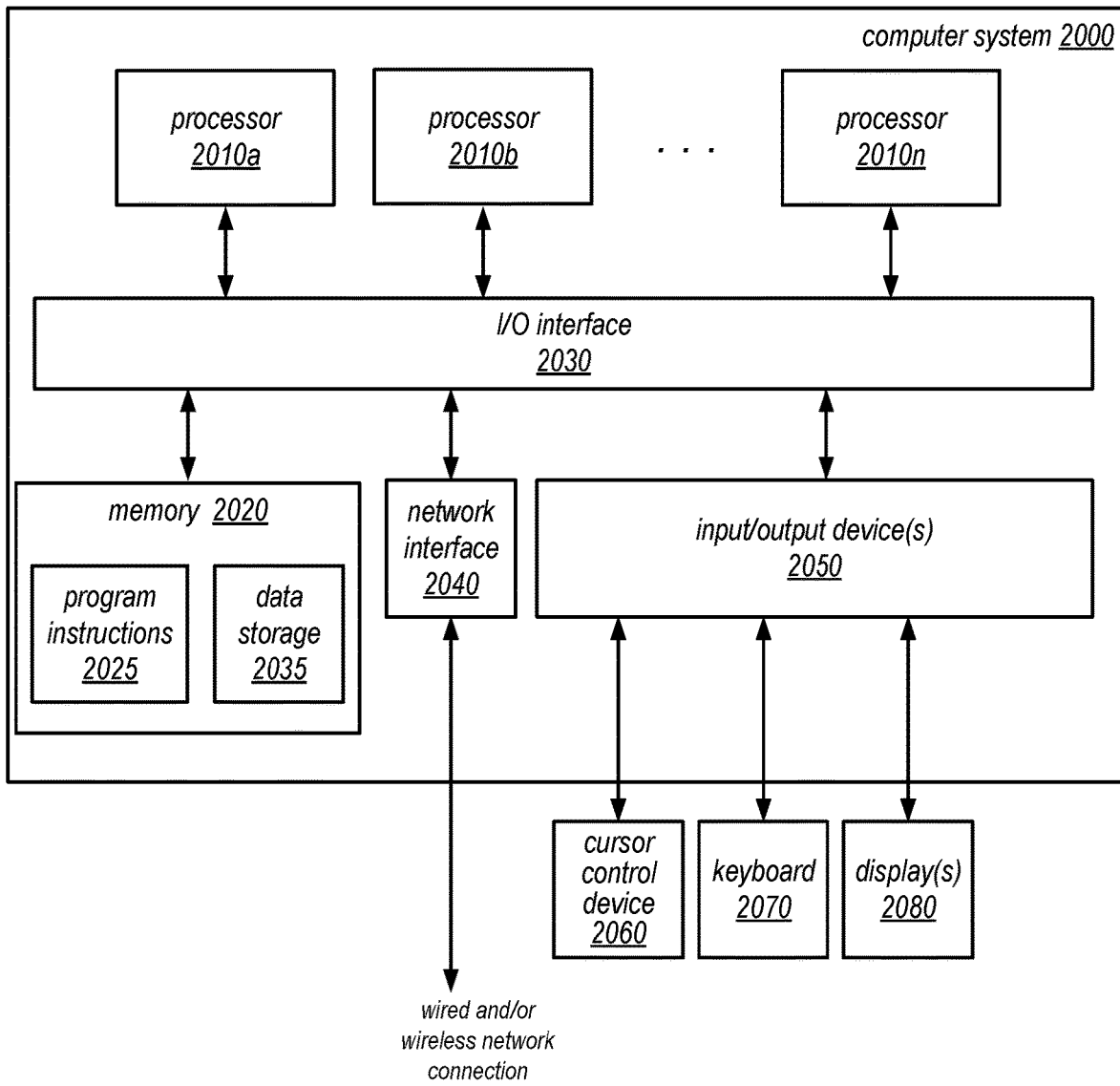
FIG. 15 illustrates an example system configured to implement the various methods, techniques, and systems described herein, according to some embodiments.

Embodiments of a managed query execution as described herein may be executed on one or more computer systems, which may interact with various other devices. One such computer system is illustrated by FIG. 15. In different embodiments, computer system 2000 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing device, computing node, compute node, computing system compute system, or electronic device.

In the illustrated embodiment, computer system 2000 includes one or more processors 2010 coupled to a system memory 2020 via an input/output (I/O) interface 2030. Computer system 2000 further includes a network interface 2040 coupled to I/O interface 2030, and one or more input/output devices 2050, such as cursor control device 2060, keyboard 2070, and display(s) 2080. Display(s) 2080 may include standard computer monitor(s) and/or other display systems, technologies or devices. In at least some implementations, the input/output devices 2050 may also include a touch- or multi-touch enabled device such as a pad or tablet via which a user enters input via a stylus-type device and/or one or more digits. In some embodiments, it is contemplated that embodiments may be implemented using a single instance of computer system 2000, while in other embodiments multiple such systems, or multiple nodes making up computer system 2000, may host different portions or instances of embodiments. For example, in one embodiment some elements may be implemented via one or more nodes of computer system 2000 that are distinct from those nodes implementing other elements.

In various embodiments, computer system 2000 may be a uniprocessor system including one processor 2010, or a multiprocessor system including several processors 2010 (e.g., two, four, eight, or another suitable number). Processors 2010 may be any suitable processor capable of executing instructions. For example, in various embodiments, processors 2010 may be general-purpose or embedded processors implementing any of a variety of instruction set architectures (ISAs), such as the x86, PowerPC, SPARC, or MIPS ISAs, or any other suitable ISA. In multiprocessor systems, each of processors 2010 may commonly, but not necessarily, implement the same ISA.

In some embodiments, at least one processor 2010 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, graphics rendering may, at least in part, be implemented by program instructions configured for execution on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies (AMD), and others.

System memory 2020 may store program instructions and/or data accessible by processor 2010. In various embodiments, system memory 2020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above are shown stored within system memory 2020 as program instructions 2025 and data storage 2035, respectively. In other embodiments, program instructions and/or data may be received, sent or stored upon different types of computer-accessible media or on similar media separate from system memory 2020 or computer system 2000. Generally speaking, a non-transitory, computer-readable storage medium may include storage media or memory media such as magnetic or optical media, e.g., disk or CD/DVD-ROM coupled to computer system 2000 via I/O interface 2030. Program instructions and data stored via a computer-readable medium may be transmitted by transmission media or signals such as electrical, electromagnetic, or digital signals, which may be conveyed via a communication medium such as a network and/or a wireless link, such as may be implemented via network interface 2040.

In one embodiment, I/O interface 2030 may coordinate I/O traffic between processor 2010, system memory 2020, and any peripheral devices in the device, including network interface 2040 or other peripheral interfaces, such as input/output devices 2050. In some embodiments, I/O interface 2030 may perform any necessary protocol, timing or other data transformations to convert data signals from one component (e.g., system memory 2020) into a format suitable for use by another component (e.g., processor 2010). In some embodiments, I/O interface 2030 may include support for devices attached through various types of peripheral buses, such as a variant of the Peripheral Component Interconnect (PCI) bus standard or the Universal Serial Bus (USB) standard, for example. In some embodiments, the function of I/O interface 2030 may be split into two or more separate components, such as a north bridge and a south bridge, for example. In addition, in some embodiments some or all of the functionality of I/O interface 2030, such as an interface to system memory 2020, may be incorporated directly into processor 2010.

Network interface 2040 may allow data to be exchanged between computer system 2000 and other devices attached to a network, such as other computer systems, or between nodes of computer system 2000. In various embodiments, network interface 2040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 2050 may, in some embodiments, include one or more display terminals, keyboards, keypads, touchpads, scanning devices, voice or optical recognition devices, or any other devices suitable for entering or retrieving data by one or more computer system 2000. Multiple input/output devices 2050 may be present in computer system 2000 or may be distributed on various nodes of computer system 2000. In some embodiments, similar input/output devices may be separate from computer system 2000 and may interact with one or more nodes of computer system 2000 through a wired or wireless connection, such as over network interface 2040.

As shown in FIG. 15, memory 2020 may include program instructions 2025, may implement the various methods and techniques as described herein, and data storage 2035, comprising various data accessible by program instructions 2025. In one embodiment, program instructions 2025 may include software elements of embodiments as described herein and as illustrated in the Figures. Data storage 2035 may include data that may be used in embodiments. In other embodiments, other or different software elements and data may be included.

Those skilled in the art will appreciate that computer system 2000 is merely illustrative and is not intended to limit the scope of the techniques as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 2000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a non-transitory, computer-accessible medium separate from computer system 2000 may be transmitted to computer system 2000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

It is noted that any of the distributed system embodiments described herein, or any of their components, may be implemented as one or more web services. For example, leader nodes within a data warehouse system may present data storage services and/or database services to clients as network-based services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the web service in a manner prescribed by the description of the network-based service's interface. For example, the network-based service may define various operations that other systems may invoke, and may define a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a web services request, a network-based services client may assemble a message including the request and convey the message to an addressable endpoint (e.g., a Uniform Resource Locator (URL)) corresponding to the web service, using an Internet-based application layer transfer protocol such as Hypertext Transfer Protocol (HTTP).

In some embodiments, web services may be implemented using Representational State Transfer ("RESTful") techniques rather than message-based techniques. For example, a web service implemented according to a RESTful technique may be invoked through parameters included within an HTTP method such as PUT, GET, or DELETE, rather than encapsulated within a SOAP message.

The various methods as illustrated in the FIGS. and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A system, comprising:
   at least one processor; and
   a memory, storing program instructions which when executed by the at least one processor, cause the at least one processor to
     receive, via an interface, a first query directed to one or more tables separately stored in one or more remote data stores, wherein respective schemas for the one or more tables are previously specified for the one or more tables via the interface;
     in response to the receipt of the first query:
       provision one or more computing resources to execute the first query from a pool of computing resources configured to execute queries;
       route the first query to the provisioned computing resources to execute the first query with respect to the separately stored one or more tables in the remote data stores based, at least in part, on the respective schemas specified for the one or more tables; and
       provide a result for the first query generated at the provisioned computing resources.

2. The system of claim 1, wherein the memory stores further program instructions that when executed by the at least one processor, cause the at least one processor to:
   receive, via the interface, a request to specify the respective schemas for one or more tables;
   store the schema for the one or more tables in a metadata store; and
   wherein the provisioned computing resources access the respective schemas in the metadata store as part of the execution of the first query.

3. The system of claim 1, wherein the the respective schemas specify at least one name for a column and at least one data type for the column.

4. The system of claim 3, wherein the at least one processor is implemented as part of a network-based managed query service, wherein at least one of the one or more tables is stored in a network-based data storage service, wherein the respective schemas are stored in a network-based data catalog service, wherein the provisioned computing resources are implemented as part of a virtual compute service, and wherein the managed query service, data storage service, data catalog service and virtual compute service are offered as part of a same provider network.

5. A method, comprising:
   receiving, via an interface, a first query directed to one or more tables separately stored in one or more remote data stores, wherein respective schemas for the one or more tables are previously specified for the one or more tables via the interface;
   in response to receiving the first query:
     provisioning one or more computing resources to execute the first query from a pool of computing resources configured to execute queries; and
     routing the first query to the provisioned computing resources to execute the first query with respect to the separately stored one or more tables in the remote data stores based, at least in part, on the respective schemas specified for the one or more tables.

6. The method of claim 5, wherein the provisioning the one or more computing resources selecting one or more computing resources that implement a particular query engine to execute the first query.

7. The method of claim 6, wherein the particular query engine is indicated in the first query.

8. The method of claim 5, wherein at least one of the tables is stored according to a different data format than another one of the tables, wherein the at least one table is stored in a different remote data store than the other one of the tables.

9. The method of claim 5, further comprising:
monitoring one or more query execution metrics for the first query;
based on the monitoring, determining that the first query execution metrics exceed a query execution limitation; and
halting execution of the first query at the computing resources.

10. The method of claim 5, further comprising:
receiving, via the interface, the respective schemas for the one or more tables;
storing the respective schemas for the one or more tables in a metadata store; and
wherein the provisioned computing resources access the respective schemas in the metadata store as part of the execution of the first query.

11. The method of claim 5, wherein the first query is received via a programmatic interface and wherein the method further comprises returning a result for the first query generated at the provisioned computing resources via the programmatic interface.

12. The method of claim 5, wherein the first query indicates a result destination for the first query, and wherein the method further comprises sending a result for the first query generated at the provisioned computing resources to the result destination.

13. The method of claim 5, wherein the first query is received at a service endpoint for a network-based service that performs the receiving, the provisioning, and the routing, wherein the first query is received from a first client, wherein a plurality of other queries are received at the service endpoint from a plurality of other clients that access one or more tables different than the one or more tables, and wherein the network-based service performs the receiving, the provisioning, and the routing for the other received queries.

14. A non-transitory, computer-readable storage medium, storing program instructions that when executed by one or more computing devices cause the one or more computing devices to implement:
receiving, via an interface, a first query directed to one or more tables separately stored in one or more remote data stores, wherein respective schemas for the one or more tables are previously specified for the one or more tables via the interface;
in response to receiving the first query:
selecting one or more computing resources to execute the first query from a pool of computing resources configured to execute queries;
removing the selected computing resources from the pool of computing resources;
associating the removed computing resources with the first query; and
routing the first query to the provisioned computing resources to execute the first query with respect to the separately stored one or more tables in the remote data stores based, at least in part, on the respective schemas specified for the one or more tables.

15. The non-transitory, computer-readable storage medium of claim 14, wherein the program instructions cause the one or more computing devices to implement:
monitoring one or more query execution metrics for the first query;
based on the monitoring, determining that the first query execution metrics exceed a query execution limitation; and
halting execution of the first query at the computing resources.

16. The non-transitory, computer-readable storage medium of claim 14, wherein the first query is formatted according to Structured Query Language (SQL).

17. The non-transitory, computer-readable storage medium of claim 14, wherein the first query is received via a programmatic interface and wherein the program instructions cause the one or more computing devices to further implement returning a result for the first query generated at the provisioned computing resources via the programmatic interface.

18. The non-transitory, computer-readable storage medium of claim 14, wherein the program instructions cause the one or more computing devices to further implement:
receiving, via the interface, a request to specify the respective schemas for the one or more tables;
storing the schema for the one or more tables in a metadata store; and
wherein the provisioned computing resources access the respective schemas in the metadata store as part of the execution of the first query.

19. The non-transitory, computer-readable storage medium of claim 14, wherein the the respective schemas specify at least one name for a column and at least one data type for the column.

20. The non-transitory, computer-readable storage medium of claim 14, wherein the one or more computing devices are implemented as part of a network-based managed query service, wherein at least one of the one or more tables is stored in a network-based data storage service, wherein the respective schemas are stored in a network-based data catalog service, wherein the provisioned computing resources are implemented as part of a virtual compute service, and wherein the managed query service, data storage service, data catalog service and virtual compute service are offered as part of a same provider network.

* * * * *